United States Patent [19]
Burkhardt et al.

[11] Patent Number: 5,218,457
[45] Date of Patent: Jun. 8, 1993

[54] HIGH SPEED, HIGH RESOLUTION IMAGE PROCESSING SYSTEM

[75] Inventors: Norman S. Burkhardt, Westminster; Maureen M. Richard, Aurora; Forrest T. Buxton, Littleton; Ronald J. Nowak, Aurora, all of Colo.

[73] Assignee: Scan-Graphics, Inc., Broomall, Pa.

[21] Appl. No.: 768,101

[22] Filed: Sep. 27, 1991

Related U.S. Application Data

[63] Continuation of Ser. No. 560,840, Jul. 31, 1990, which is a continuation of Ser. No. 296,711, Jan. 13, 1989, Pat. No. 4,972,273, which is a continuation of Ser. No. 931,122, Nov. 17, 1986, abandoned, which is a continuation of Ser. No. 660,854, Oct. 15, 1984, Pat. No. 4,631,598.

[51] Int. Cl.[5] .............................................. H04N 1/40
[52] U.S. Cl. .................................... 358/448; 358/455; 358/465; 358/426
[58] Field of Search ............... 358/425, 426, 455, 465, 358/483, 448, 451

[56] References Cited

U.S. PATENT DOCUMENTS 4,675,745  6/1987  Suzuki .................................. 358/483
4,972,273  11/1990  Burkhardt ........................... 358/443

OTHER PUBLICATIONS

"Image Processing Enters a New Era-Where Does Computer Graphics Meet Image Processing?", Pixel Magazine, No. 16, Jan., 1984. (Translation).

Primary Examiner—Edward L. Coles, Sr.
Assistant Examiner—Thomas D. Lee
Attorney, Agent, or Firm—Caesar, Rivise, Bernstein, Cohen & Pokotilow, Ltd.

[57] ABSTRACT

A scanning device which is capable of scanning documents at high speeds and high resolutions. The present invention uses automatic thresholding techniques and provides variable data compression to accommodate various end user host devices. The present invention is entirely menu driven and utilizes a cursor control and enter button to select the various options available through software.

7 Claims, 24 Drawing Sheets

FIG. 2 VIDEO CONVERTER BOARD

SPATIAL COMPRESSOR BOARD

AUTOMATIC THRESHOLD BOARD

FIG. 7 TASK SUPERVISOR MODULE

BUFFER MANAGER

INTER-TASK COMMUNICATION HANDLER

TIMEOUTS PROCESSOR MODULE

BYTE I/O HANDLERS

EEPROM HANDLER

INITIALIZATION MODULE

CONSOLE MANAGER MODULE -
DISPLAY DRIVER TASK

CONSOLE MANAGER MODULE -
KEYPAD HANDLER TASK

CAMERA-CONTROLLER INTER-FACE TASK

AUTO-THRESHOLDING BOARD INTER-FACE TASK

DISPLAY COMPRESSOR BOARD INTER-FACE TASK

FRAME BUFFER INTERFACE TASK

SPATIAL COMPRESSOR BOARD
INTERFACE TASK

DOCUMENT FEED CONTROLLER
INTER-FACE TASK

INTERRUPT HANDLERS
MODULE

INTERRUPT HANDLERS MODULE

DIAGNOSTICS TASK MODULE

HIGH SPEED, HIGH RESOLUTION IMAGE PROCESSING SYSTEM

This application is a continuation of application Ser. No. 07/560,840, filed Jul. 31, 1990 which is a continuation of application Ser. No. 07/296,711 filed Jan. 13, 1989 now U.S. Pat. No. 4,972,273, which is a continuation of application Ser. No. 06/931,122 filed Nov. 17, 1986 now abandoned, which is a continuation of application Ser. No. 06/660,854 filed Oct. 15, 1984 now U.S. Pat. No. 4,631,598.

BACKGROUND OF THE INVENTION

The present invention pertains generally to optical scanning systems and more particularly to high speed, high resolutions systems for scanning documents and producing digital binary data representative of this scanned information. Data scanning systems are useful for various purposes including storage and transmission of documentary material in a form of digital binary data. The digital binary data can be stored on magnetic disk storage media in an economical and convenient manner. Scanning systems using magnetic storage media comprise an extremely useful means for reducing hard filed documentation. With the advent of development of high speed computer communications technology and the significant increase in data storage handling capabilities of currently available hardware, digital binary data can be rapidly transmitted and stored at high data transmission rates.

A major disadvantage, however, of prior art data scanning systems has been the inability of these systems to provide a high speed process which is capable of providing a high resolution signal. Both high speed and high resolution is required in many applications to make such a system feasible, especially where large volumes of documentary material must be scanned at a high rate of speed with sufficient detail for reproduction of the documentary material with a high degree of resolution. To date, prior art scanning systems have been unable to provide a high resolution, high speed scanning system. High resolution systems have been available which operate at slow speeds, such as laser scanner devices which serially illuminate each pixel element with a laser beam. Although such systems provide a high degree of resolution, they have a quite slow operating speed since each pixel element is singly illuminated during the laser scanning process. Prior art high speed systems, on the other hand, have a low resolution and provide inadequate reproduction of the scanned data in many applications. An example of such a high speed, low resolution system is a facsimile device which utilizes a vidicon camera to scan the documentary data. Consequently, although such systems can operate at high speeds to scan a large amount of data, the resolution provided is insufficient for many applications.

Hence, the prior art has been unable to provide both a high speed and high resolution document scanner system.

OBJECTS OF THE INVENTION

It is therefore an object of the present invention to provide a high resolution, high speed document scanning system.

It is also an object of the present invention to provide a high speed, high resolution document scanning system which is capable of producing information in a digital binary format.

Another object of the present invention is to provide a high speed, high resolution document scanning system which is capable of producing digital information with a variable resolution.

Additional objects, advantages and novel features of the invention are set forth in the description which follows and will be understood by those skilled in the art on examination of the following or may be learned by practice of the invention. The objects and advantages of the invention may be realized and obtained by means of the instrumentalities and combinations particularly pointed out in the appended claims.

SUMMARY OF THE INVENTION

The present invention overcomes the disadvantages and limitations of the prior art by providing a high speed, high resolution document scanning system. The present invention utilizes a plurality of CCD linear array cameras which are merged together electronically and aligned mechanically to provide a single linear array of scanners which is capable of scanning a wide document, e.g., 40 inches, with a high resolution, e.g., 1,000 pixels per inch. Additionally, the present invention is capable of providing a variable resolution output to match the data handling capabilities of the host computer of the user. Automatic scanning widths are also provided, together with image enhancement algorithms including edge detection algorithms to increase the speed of scanning and the quality of the data produced by the present invention. Display processing is also provided which allows for windowing and compression of data so that portions of the scanned data can be viewed in real time with high resolution, or larger sections can be viewed with a lower resolution. The entire system operates with menu driven software which fully automates the processes of the device of the present invention.

The present invention may therefore comprise a high speed, high resolution document scanning system comprising: linear detector array means for producing an analog signal representative of data optically scanned from the document; video converter means for digitizing the analog data and calibrating digitized data produced by the video converter means to adjust for differences in response levels of individual detector elements of the linear detector means; spatial compressor means for electronically compressing data by both integer and fractional values to match the data handling capabilities of an end user device; automatic thresholding means for setting threshold levels and implementing image enhancement algorithms; camera controller means for splicing overlapping data produced by the linear detector array means to produce raster lines of non-overlapping and continuous data and for providing a variable delay time between production of the raster lines of data to control the scanning speed and average data output rate; display compressor means for electronically displaying the data optically scanned from the document in real time with a preselected variable resolution to allow varying amounts of the data to be displayed on the display means.

The present invention may also comprise a high speed, high resolution document scanning system comprising: CCD detector means aligned in a linear array for sequentially scanning documentary data and producing an analog signal representative of scanned documentary data; video converter means for digitizing the analog signal and calibrating the digital signal for response levels of individual detector elements of the CCD detector means; spatial compressor means for electronically compressing data by both integer and fractional values to match the data handling capabilities of an end user device; automatic thresholding means for setting gain and offset levels and for performing pixel averaging and prediction techniques to detect edges and filter out noise variances; camera controller means for controlling the sequential reading of data from the CCD detector means to the video converter means, merging overlapping data from the CCD detector means to provide raster lines of non-overlapping and continuous data selecting a contiguous subset of detector arrays of the CCD detector array means which fall within the scan width of the documentary data and selecting a predetermined dead time between the raster lines of data to variably control the scanning speed of the scanning system to control the average data output rate; display means for electronically displaying the scanned documentary data in real time with a preselected variable resolution allowing varying amounts of the scanned documentary data to be displayed.

BRIEF DESCRIPTION OF THE DRAWINGS

An illustrative and presently preferred embodiment of the invention is shown in the accompanying drawings wherein.

DETAILED DESCRIPTION OF THE PRESENT INVENTION

Figure 1:
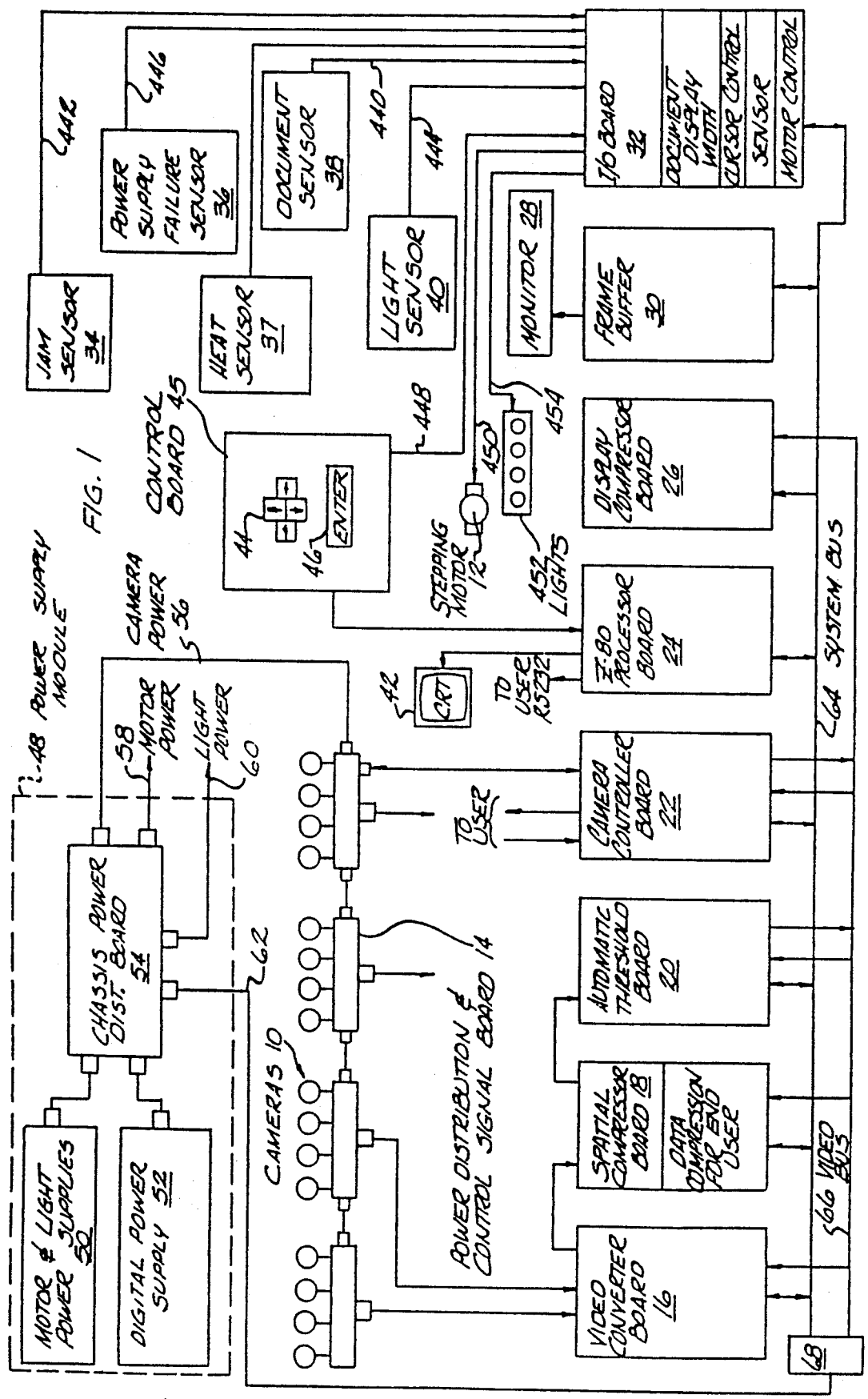
FIG. 1 is a schematic block diagram of the device of the present invention.

FIG. 1 comprises a block diagram of the device of the present invention. As illustrated in FIG. 1 a series of 16 cameras 10 are used to scan documentary data which is moved by a stepping motor 12 with a mechanical document movement system. Stepping motor 12 functions to incrementally step the document to be scanned past the cameras 10. The speed at which stepping motor 12 operates is automatically controlled by software to coincide with the data handling capabilities of the host computer used to transmit or store date in conjunction with the device of the present invention.

Additionally, stepping motor 12 is automatically controlled to compensate for the programmed resolution and scan width parameters of the system to ensure that data can be transmitted at an average data rate suitable for use by an end user host device.

Cameras 10 comprise a plurality of linear CCD array cameras, such as the Fairchild CCD 143 Model having 2,048 element line image sensors or other linear array cameras having either more or less elements. The charge couple devices are aligned in a linear array to scan a segment of printed data from a document with the resolution of up to approximately 1,000 pixels per inch. The charge couple devices employ n-channel isoplanar varied channel technology which can operate at data rate speeds above 20 megahertz. The linear image sensors have an enhanced spectral response particularly in the blue region with high responsivity. The sensor uses "on-chip" clock drivers in a dynamic range typically of 2,500 to 1. Dark and white reference signals are contained within sample and hold outputs and the camera requires a single power supply.

Referring again to FIG. 1, cameras 10 are coupled to power distribution and control signal board 14 which functions to provide cameras 10 with proper power and control exposure time and synchronous clocking of data. Exposure times are typically on the order 304 microseconds per camera. The data produced by cameras 10 is output to video converter board 16 which transforms the analog waveforms produced by cameras 10 through a digitizing process to produce a digital signal to be used with the remaining digital equipment of the system.

The video converter board (VCB) converts analog pixel (picture element) data into useable digital data. Additionally, the video converter board provides circuitry to clamp a dc pedestal voltage produced by cameras 10 to a level necessary for analog to digital conversion. Individual pixel response calibration is performed by system software upon initialization of the document scanner device of the present invention. The procedure corrects for differences in the response levels of the elements of the imaging array to provide contrast for maximum white and dark levels. Also, the correction process adjusts for light degradation in the scanner lighting system. The video converter board also includes a test pattern generator for producing a test pattern to test digital processing path integrity and test circuitry downstream from the video converter board. The test pattern is loaded in PROM and includes the functionality to be changed to match testing requirements.

Data from the video converter board 16 is transmitted to spatial compressor board (SCB) 18 which functions to compress data electronically in the x-direction, i.e., in the direction of the linear array. Data compression in the y-direction is accomplished by motor speed control movement of the document. Scanner controller board provides data compression for the end user to match the data handling capabilities of the end user system in accordance with the resolution desired. The spatial compressor board is capable of compressing data by a value of 1, 2, 3, or 4, or any fractional value from 1 to 4.

Data from the spatial compressor board is then applied to the automatic threshold board (ATB) which accepts 8 bit pixel data at data rates of up to 8 megahertz coming from the video converter board or the spatial compressor board. The automatic threshold board receives a clock pulse from the video converter board or spatial compressor board and derives a pixel clock signal for the display compressor board and the camera controller board output section. The automatic threshold board also derives the pixel offset and gain values which comprise the deviation of the video pixel data values from full the dark value and from full scale value. The adaptive threshold board also performs pixel averaging and automatic thresholding to perform edge detection and prediction of pixel values to filter out noise variances.

Camera controller board (CCB) 22 functions to control the sixteen CCD linear array cameras 10. The camera controller board includes a camera multiplexer, a camera scan merger, and a scan window controller. The camera multiplexer allows one timing and control circuit to control 16 cameras. A line merger concatenates the 16 camera output into a single data line (raster line) with the overlapping pixels deleted. The window controller selects a contiguous sub-set of the total scan width. Cameras 10 which are not involved in the window may be deselected to provide higher scan rates for narrower scan widths.

The Z80 processor board comprises a central processing unit available from the Zilog Corporation for both processing and controlling data provided by other boards on the system. The Z80 processor board 24 functions in response to software loaded into the system by way of a special software loading computer (not shown) coupled to the Z80 chip.

CRT monitor 42 comprises a monitor coupled to Z80 processor board 24 to display the software menus used to drive the Z80 processor board 24. Control board 45 is also connected to Z80 processor board 24. Control board 45 has a cursor control 44 and an enter button 46 mounted thereon. Cursor controls 44 control a cursor on CRT monitor 42 to indicate the selection of various parameters of the system. Cursor controls 44 can comprise button controls or a joy stick. Enter key 46 functions to enter the selected parameters indicated by the cursors displayed on CRT 42.

Display compressor board (DCB) 26 functions to compress data in two dimensions for display on CRT monitor 28. CRT monitor 28 typically has 1,024 pixel elements in the horizontal direction and 728 pixel elements in the vertical direction. Since cameras 10 can produce a resolution of $2,084 \times 16$ pixel elements in the x (horizontal) direction, to view the entire scanned document, it is necessary to compress data for display on CRT monitor 28. The display compressor board also functions to control the windowing function of the present invention so that particular windows of data can be viewed on CRT monitor 28 at a desired resolution. Windowing parameters are entered through software functions controlled by Z80 processor 24.

Frame buffer 30 comprises a buffer for both storing and formatting data for video display. A typical frame buffer for use with the present invention comprises a model HRG 3000 High Resolution Graphics Controller available from Ikier Technology, Inc. 7 Oak Park, Bedford, Mass. 01730, Order No. 100-10-09-700. Data from the frame buffer 30 is coupled directly to monitor 28 for video display of the data.

I/O board 32 comprises an interface board for all analog and miscellaneous digital signals of the document scanner system illustrated in FIG. 1. The I/O board 32 includes board programmable interrupt controllers and status registers. I/O board 32 comprises an interface between jam sensor 34, power supply failure sensor 36, document sensor 38, light sensor 40, stepping motor 12, and the processing control board as illustrated in FIG. 1.

Power supply module 48 supplies power to various portions of the document scanner illustrated in FIG. 1. Motor and light power supplies 50 provide power at the proper voltage and amperage level to operate stepping motor 12 and for illuminating the document. Digital power supplies 52 provide power at the proper voltage and amperage level to operate the digital components of the present invention. Chassis power distribution PC board 54 functions to distribute the power to the proper locations. For example, camera power is supplied to power distribution and control signal board 14 by way of connector 56. Motor power to stepping motor 12 is supplied by connector 58. Light power to illuminate the documents is supplied by connector 60. Power to operate the digital components of the present invention is supplied by connector 63.

The present invention uses a dual bus system comprising a system bus 64 which conforms to IEEE standards 796. The system bus 64 conforms strictly to the P1 standards of a MULTIBUS (a trademark of the Intel Corporation) system as established by Intel Corporation. Video bus 66 essentially conforms to the P2 standard of the MULTIBUS system. Chassis power connector 68 comprises a connector for coupling system bus 64 and video bus 66 to the power supplied by connectors 62 from chassis power distribution PC board 54.

Figure 2:
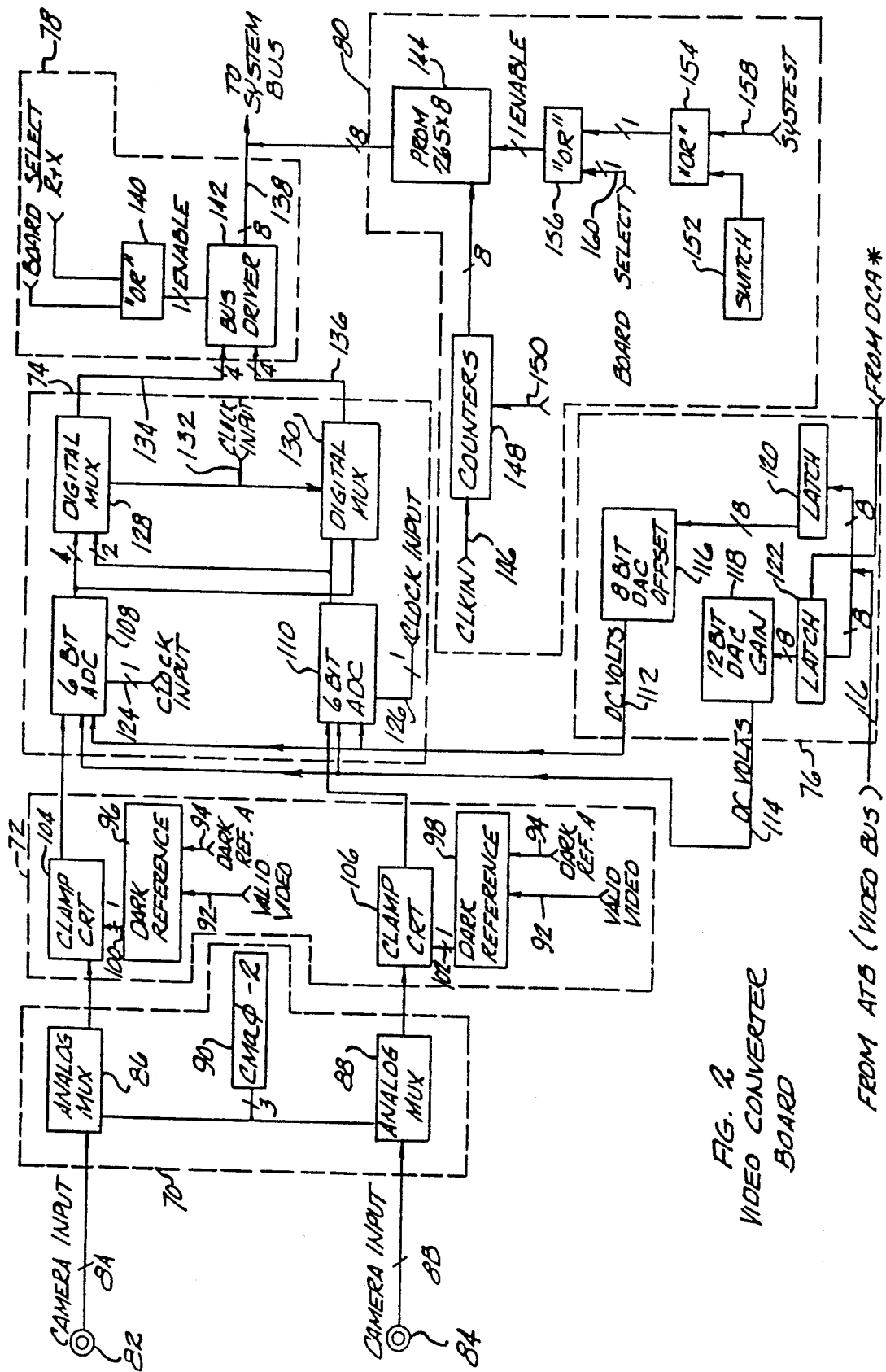
FIG. 2 is a detailed block diagram of the video converter board.

FIG. 2 is a schematic block diagram of the video converter board. The primary function of the video converter board is to convert analog optical information into a digital format. It serves as an interface between solid state linear scanner cameras 10 and the digital processing hardware illustrated in FIG. 1. The ADC's provide a 6 bit true binary output for each image pixel sample.

FIG. 2 illustrates the six primary components of the video converter board 16. Video converter board 16 comprises analog multiplexer 70, dc restoration and clamp circuitry 72, analog to digital converters 74, offset and gain digital to analog converters 76, switch 78, and software selectable pattern generator 80. The input from the 16 cameras 10 is divided into two channels. Each camera has two separate input channels A and B. Channel A contains all of the odd numbered pixel elements, while channel B contains all the even numbered pixel elements. Two channels are used to aid in clocking of the data at a higher data transmission rate. Analog data from the cameras is coupled to camera inputs 82, 84 for channels A and B, respectively, by way of a coaxial cable. As stated previously, each camera may contain 2,048 photosite elements. The analog data produced by the camera is shifted out via two time division multiplexed analog video outputs through the coaxial cables connected to camera inputs 82, 84 of video converter board 16. The output video data rate from cameras 10, when measured in pixels per second, is equal to the input frequency of 8 megahertz of a data rate clock signal produced by cameras 10. Complete camera specifications and a description is provided in a manual produced by Fairchild, entitled "CCD the Solid State Imaging Technology" available from Fairchild CCD Imaging, 3440 Hillview Avenue, Palo Alto, Cal. 94304, which is specifically incorporated herein by reference.

Two single 16 channel analog multiplexers 86, 88 are used to gate video data in the video converter board 16. As illustrated in FIG. 2, analog multiplexer 86 gates data from channel A, while analog multiplexer 88 gates data on channel B. Camera controller board 22 (FIG. 1) provides four camera select bits for use by the video converter board (FIG. 2). Three TTL signals are provided through input 90 which comprise camera address inputs to analog multiplexers 86, 88. The camera address inputs provided through input 90 select one of the 16 cameras to read data. A new address is generated after the last data bit is transmitted from the camera signalled by the following edge of a valid video signal produced by the camera converter board 26. The valid video signal comprises a level signal indicating the period during which the actual one volt peak-to-peak valid video data is being produced by cameras 10. This is distinguished from other data produced prior, and subsequent to, the valid video (scanned image) data.

Included in the additional data provided by the camera output are dark reference pixels which are not a portion of the valid video data. The dark reference pixels comprise photosite elements that provide a reference voltage equivalent to device operation in absolute dark to set the zero reference level. The dark reference pixels comprise "header pixels" produced prior the valid video pixels. During the receipt of the dark reference pixels, the valid video signal derived from camera converter board 26 is inactive. During this period, dc restoration is performed. A maximum time period of 4 microseconds is available for dc restoration. Both the valid video signal 92 and dark reference signal 94 are derived from the camera controller board 22. Flip-flops 96, 98 provide a output signal 100, 102 to clamp circuits 104, 106, respectively, indicating the presence of valid video data. Clamp circuits 104, 106 receive the analog data from analog multiplexers 86, 88 with an 8 volt dc pedestal. Clamp circuits 104, 106 extract the analog portion of the video data, typically 1 volt peak-to-peak video data, for subsequent analog to digital conversion in analog-to-digital converters 108, 110. Clamp circuits 104, 106 use fast switching P channel JFET transistors and high speed comparators to eliminate the 8 volt dc pedestal voltage.

Offset and gain correction circuitry 76 provides calibration signals to ADC circuitry 108, 110. Offset calibration signal 112 provides an 8 bit offset signal indicating the deviation of the video signal from zero volts (offset signal). Similarly, calibration signal 114 provides a 12 bit binary signal indicating the deviation of the video signal from full scale (gain signal).

Traditionally, calibration of analog to digital circuitry normally includes the use of potentiometers. Potentiometer derive voltages used to adjust the digital output codes for zero and full scale input voltages. In most circumstances, calibration has been performed pursuant to such methods during long intervals or during system installation. No consideration is given to errors that develop by varying environments or potentiometer drift. Offset and gain calibration voltages, once set by potentiometers, are normally left at the original settings. Offset and gain calibration circuitry 76 is designed to automatically calibrate the analog to digital converters 108, 110 on a pixel by pixel basis. Calibration is performed by using high speed digital to analog converters 116, 118. New offset and gain values are recalculated each time the scanner scans a new document.

Offset errors are defined as the analog value by which the output code deviates from zero for an input analog voltage of zero. Gain error is the difference in full scale value between what is expected and the actual full scale output code. The gain error is valid only when the offset error is zero. For this reason, offset calibration is performed first. Offset error correction provides the basis for full scale gain calibration. Offset and gain parameters are provided from the automatic threshold board 20 which derives the values of the offset and gain from actual scanned pixel data during a calibration run. Offset values are latched in latch 120 while gain values are latched in latch 122 to provide glitch free operation of offset digital to analog converter DAC) 116 and gain DAC 118. A 6 bit ADC 108 and a 6 bit ADC 110 comprise flash analog to digital converters (DAC) available from TRW Corporation. Typical ADC units for use with the present invention comprise Model TDC 1014. Pixel data inputted into the video converter board is converted to a 6 bit non-inverted binary equivalent. The offset and gain calibration signals 112, 114, respectively, are applied to the ADC's 108, 110 to ensure the proper level of operation. Clock inputs 124, 126 clock information into the ADC's 108, 110, respectively, at the proper times. Clock input 132 drives digital multiplexers 128, 130 to provide two outputs, 134, 136 which represent the multiplexed camera data. Switch 178 functions as a single pole double throw switch to enable or disenable the output 138 containing the digitized pixel data. Switch 78 comprises an "or" circuit 140 which operates from board select signals and a driver 142 for connection to video bus 66. Output 138 is disenabled during operation of pattern generator 80. Pattern generator 80 is implemented by the video converter board to test digital path integrity and to exercise logic circuitry on other boards within the system. The pattern generated by pattern generator 80 is contained in a 256×8 bit PROM 144. Clock-in pulse 146 functions to increment counter 148 to provide a sequence of addresses to PROM 144 and sequentially read out data stored in PROM 144. An end of line signal 150 functions to clear counter 148 at the end of each line of raster scan line data. Switch 152, circuit 154, or circuit 156 function to provide logic circuitry for enabling the operation of PROM 144 pursuant to system test signal 158 and board select signal 160.

Figure 3:
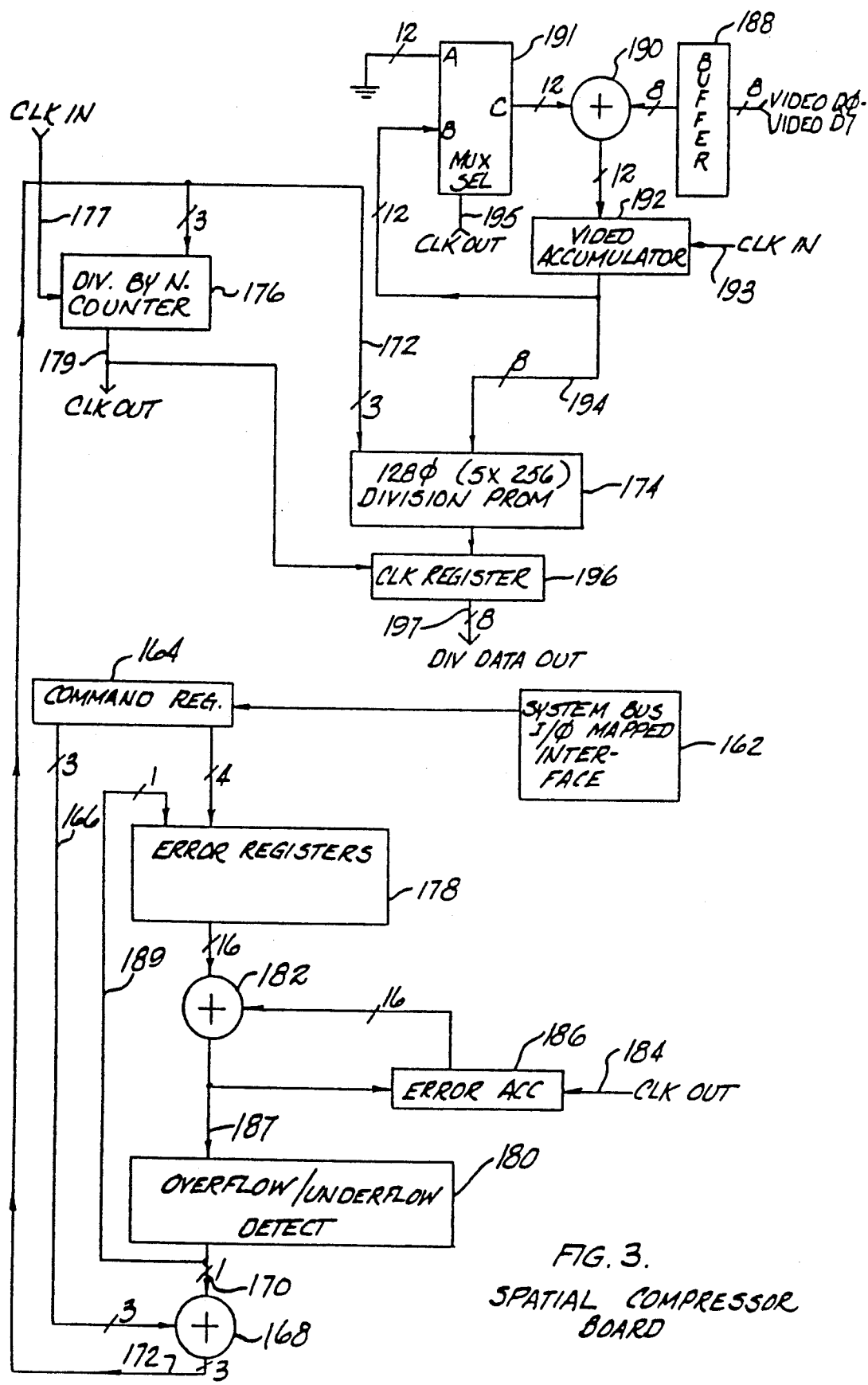
FIG. 3 is a detailed block diagram of the spatial compressor board.

FIG. 3 is a schematic block diagram of the spatial compressor board. The function of the spatial compressor board is to compress data to be transmitted to the end user device. The spatial compressor board is capable of compressing data by an integer value of 1, 2, 3, or 4 and certain fractional values between those integer values. This is accomplished by dividing by a integer value (n) for a predetermined period and then dividing by that integer value plus one (n+1) for a second predetermined time. For example, if it were desired to compress the data by a fractional value of 3.5, the spatial compressor board would accumulate and divide by 3 for half a time and accumulate and divide by 4 for the other half of the time. Of course, the accumulated pixel data points is equal to the value of the divisor (i.e., either 3 or 4) each time the division takes place.

This is accomplished in the spatial compressor board by the loading of error values and error limits by software through a system bus I/O mapped interface 162. Command register 164 produces an output 166 comprising the integer value of the divisor selected. The divisor numbers are applied to adder 168 and transmitted to output 172 until input 170 increments the divisor by an integer value of 1. Until that time, the divisor selected by command register 164 is transmitted to the output 166 and connector 172 for application to division PROM 174. Connector 173 functions to select the divisor in division PROM 174. In practice, division PROM 174 comprises a plurality of division PROMS and input 172 functions to select the particular division PROM which corresponds to the divisor number (1, 2, 3, or 4) produced on line 172. The integer divisor number selected is also applied to divide by n counter 176 which accumulates the clock-in signal 177 until it reaches the divisor value and produces clock-out signal 179. Video data from the video control board is applied to buffer 188 which buffers the data and applies the digitized video signal to adder 190. The output of adder 190 is applied to video accumulator 192 which stores the output of summer 190. On the first video data point the value is stored in video accumulator 192. This value is applied to multiplexer 191 which adds the value of the first pixel data point to the value of the second pixel point in adder 190. This value is then stored in video accumulator 192. Video accumulator 192 is zeroed for each clock-out pulse. Output 194 of video accumulator 192 is applied to division PROM 174. The value of the accumulated data on line 194 comprises an address for division PROM 174. As set forth above, input line 172 selects the divisor value for division PROM 174. Division PROM 174 comprises a look-up table with values stores therein corresponding to the results of the calculated division for the address provided by the accumulated video pulse on line 194. The clock-out signal 179 clocks register 196 to store the value addressed by division PROM 174 at the end of a time period when the number of clock pulses equals the integer divisor value. Clock out signal 179 is also applied to multiplexer 191 on select line 195 to provide a zero value to adder 190 to restart the accumulation process in video accumulator 192.

Consequently, video data is accumulated for a predetermined number of pixel data points equal to the preselected divisor number so that the total accumulated value of the pixel data points is divided by a divisor equal to the number of pixel data points which constitutes an address signal for look-up PROM 174. The value addressed in the look-up table 174 by the address signal is stored in register 176 and clocked out on output line 197. The divisor number provided on line 166 is incremented by an integer value of one from connector 170 during predetermined periods to provide an overall output which is an average equal to the fractional divisor value desired. The predetermined periods in which the divisor value provided on line 166 is incremented by one is controlled by the error values stored in error register 178 and the error limit values stored in overflow/underflow detector 180. The predetermined error value is loaded through I/O mapped interface 162 into command register 164 which loads error register 178 with the error value selected by software. The error register values stored in error register 178 are applied to adder 182. That error value is accumulated in error accumulator 186 for each clock-out pulse 184. Each time a clock-out pulse is produced on line 179 by divide by n counter 176, the error accumulator 186 is incremented by the value stored in error register 178. Overflow/underflow detector 180 has predetermined error limits stored therein and compares the input 187 produced by adder 182 with the stored error limits. The lower error limit is zero while the upper error limit is loaded by software. When the upper or lower limits are reached, overflow/underflow detector 180 produces an output 170 which is applied to adder 168 to increment or decrement the divisor number by one integer value. Output 170 from overflow/underflow detector is also applied to error register 178 to shift error register 178 to a new register value stored in error register 178. Control line 189 typically shifts error register 178 to a new error value which has an opposite sign from the first error value stored in error register 178. The negative value is then accumulated in error accumulator 186 until the lower error limit is reached. This produces an output which decrements the error value supplied by command register 164 on line 166 by one integer value $(n-1)$.

Consequently, the divisor number supplied on line 172 is incremented and decremented by integer values at predetermined times controlled by the error values stored in error register 178 and error limits stored in overflow/underflow detector 180 to cause a division by the integer values 1, 2, 3, or 4 for preselected periods so as to produce an output which has an average value of a predetermined fractional data compression value.

Figure 4:
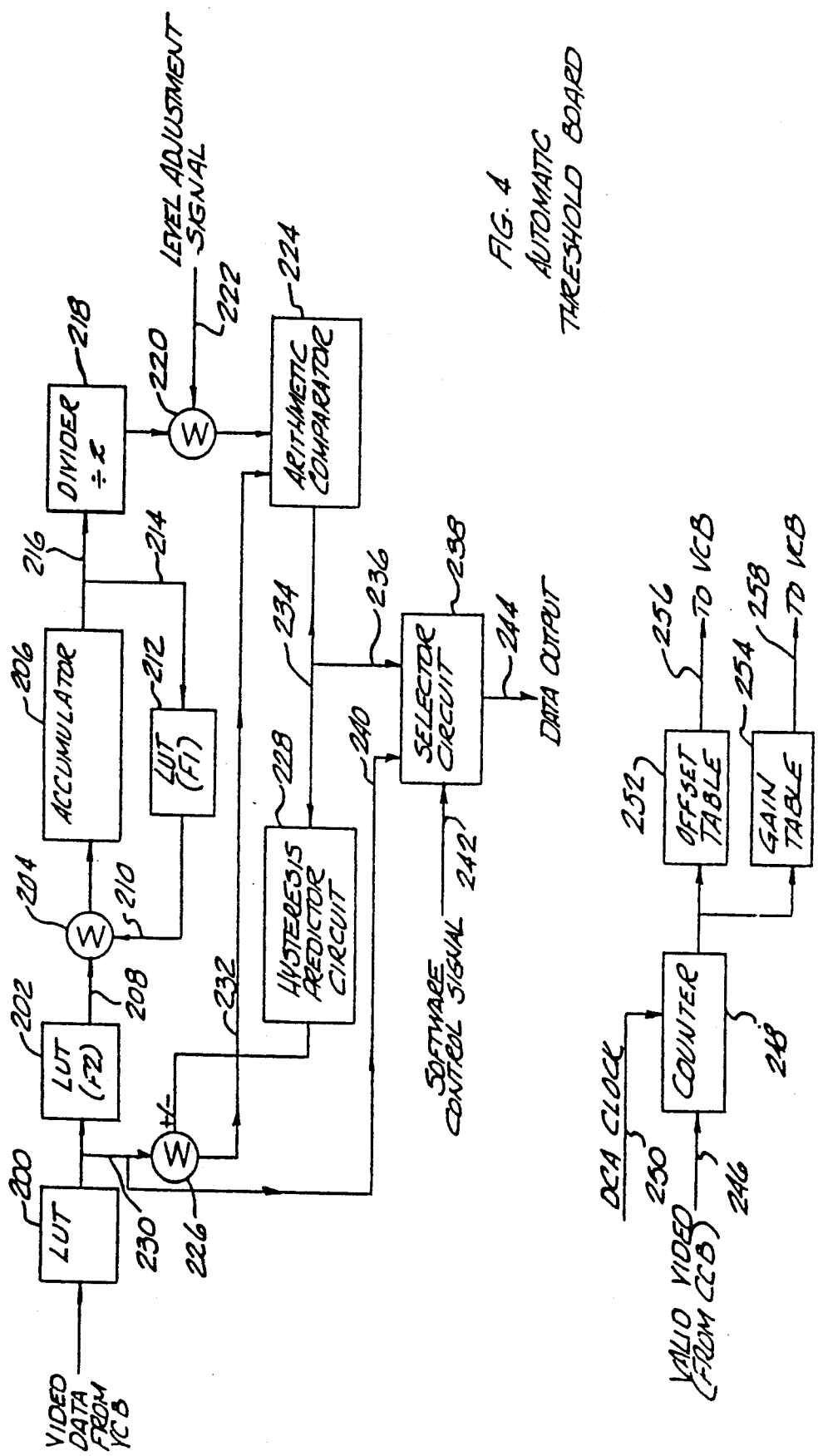
FIG. 4 is a detailed block diagram of the automatic threshold board.

FIG. 4 discloses the automatic threshold board 20. Video data from the spatial compressor board is supplied to look-up table 200 which provides non-linear scaling of the video data. This can be used for the purpose of grey scale equalization, exponential weighting of the video signal and other image enhancement techniques. The output of look-up table 200 is applied to look-up table 202 which uniformly and linearly multiplies the video data produced by look-up table 200 by a prescaling factor of less of one to reduce the value of the video data signal so that the remaining digital components of the system do not go into an overflow condition. The output of look-up table 202 is applied to adder 204 and accumulator 206 which accumulates the value of the output of 208 of look-up table 202 and the output of 210 of look-up table 212. Look-up table 212 multiplies the contents of accumulator 206 on output 214 by a number less than one. Summer 204, accumulator 206, and look-up table 212 comprise an infinite series loop which multiplies the accumulated value by a number less than one. The infinite series loop produces a geometric series wherein the multiplier values F1 of look-up table 212 and F2 of look-up table 202 are selected such that the output 216 applied to divider circuit 218 is an accumulation which represents the average of the last 10 to 20 pixels. The multiplier values F1 and F2 can be changed to change the amount of pixel elements which arc included within the averaging process performed by the infinite series loop. The average value signal produced at output 216 is applied to divider 218 which divides the signal by 2. This signal is added together with a level adjustment signal 222 in adder circuit 220. The level adjustment signal adjusts the darkness or lightness of the signal. The output of adder circuit 220 is applied to arithmetic comparitor 224.

The video data which has been image enhanced by look-up table 200 is also applied to adder circuit 226 which either adds or subtracts a hysteresis value produced by hysteresis predictor circuit 228. Hysteresis predictor circuit 228 uses the output of arithmetic comparitor 224 to add a small plus or minus hysteresis value which comprises a value added to the video signal 230 to predict the value of the next pixel element based upon previous pixel elements. The hysteresis signal can be considered to be a value which adds inertia to the system based upon previously detected pixel elements. The output signal 232 of adder circuit 226 is applied to arithmetic comparitor 224 which produces an output 234 which comprises a 1 bit signal which is active when the video signal 232 is greater than the average video input from adder 220. This 1 bit signal comprises an on/off signal to indicate whether the detected pixel element is either on or off. This thresholded signal is also applied to selector circuit 238 by way of input 236. The video data signal produced by look-up table 200 is also applied to selector circuit 238 by way of input 240. Selector circuit 238 functions to select either the video data signal 240 or the thresholded video data signal 236 in accordance with a control signal 242 produced by the software. The selected signal is output on data output line 244.

The automatic threshold board 20 illustrated in FIG. 4 also drives offset and gain values for the video converter board. A valid video signal 246 derived from the camera controller board is applied to counter 248. The valid video signal 246 comprises a level control signal indicating the presence of valid video data. DCA clock 250 is gated on by the valid video signal. Counter 248 then counts the DCA clock signal during the period of time that the valid video signal 246 is active. Counter 248 accumulates a count which successively addresses locations in offset table 252 and gain table 254. The offset and gain tables have previously calculated and loaded values stored therein from an initial test run by viewing the platten without the document inserted therein. This indicates the deviation of gain from maximum and the offset of the dark level signal from zero. The offset and gain values for each pixel are then applied to the VCB 16 by connectors 256 and 258.

Figure 5:
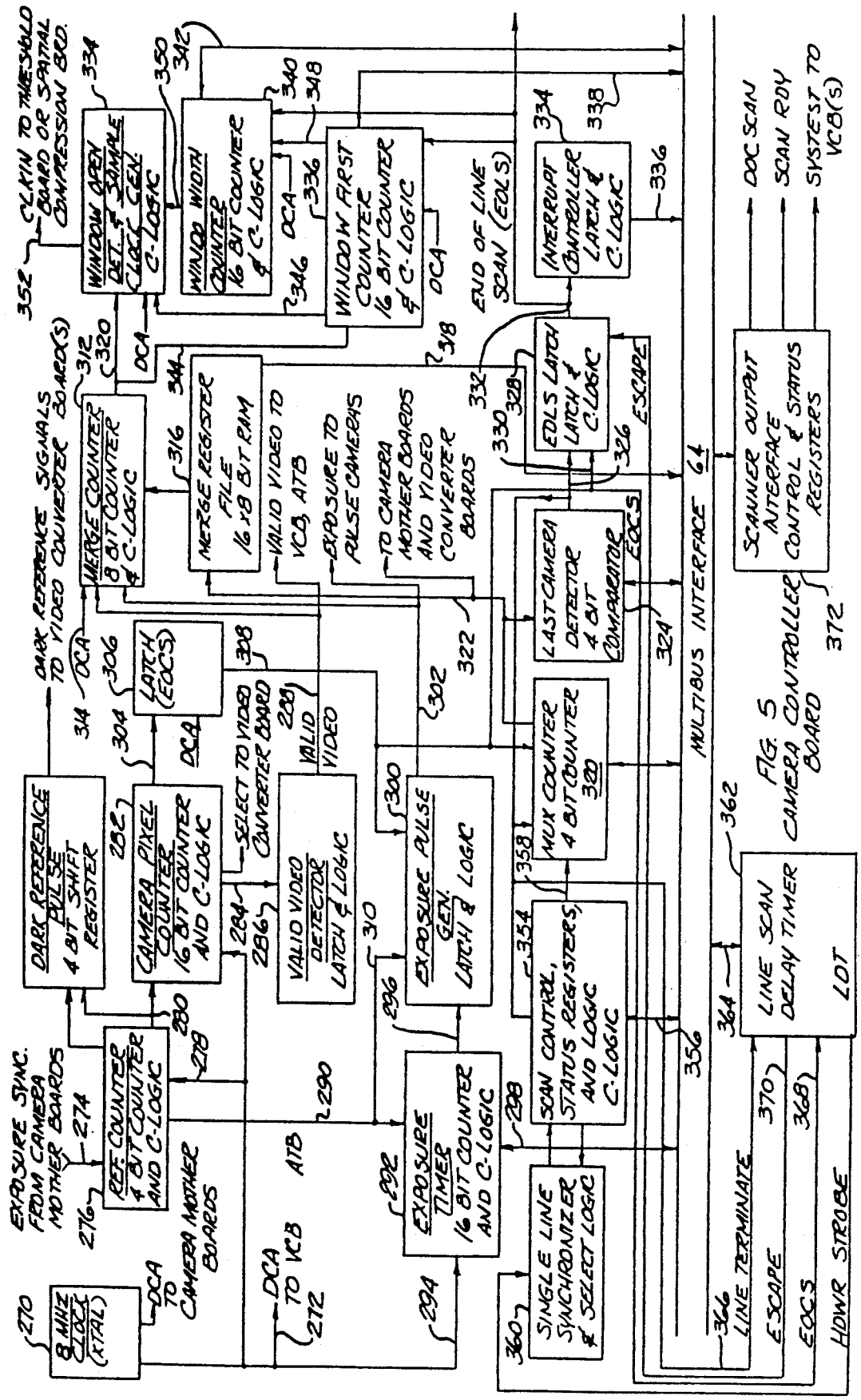
FIG. 5 is a detailed block diagram of the camera converter board.

FIG. 5 is a detailed block diagram of the camera controller board 22 of the present invention. The camera controller board (CCB) 22 is intended to control a cluster of 16 Fairchild CCD solid state video cameras and transmit serial streams of image data to an end user for image processing applications. The CCB must interact with a document feed controller to ensure that the scan rate is synchronized with stepping motor 12. The CCB is initialized by software and functions automatically subsequent to initialization. A merge controller is included within the CCB and assigns a merge value to each camera scan. The merge value indicates how many pixels at the beginning of each camera's scan line must be deleted to accurately splice the data produced by the camera to provide a continuous non-overlapping raster line of data. This process of splicing or stitching the electronic data is required because of the inability of the mechanical devices to align the plurality of cameras 10 to ensure a non-overlapping and continuous raster line of scanned data.

The windowing function of the present invention provides for the sampling of a contiguous subset of the merged data. The camera controller board illustrated in FIG. 5 allows software to reconfigure the system by deactivating various cameras via a camera enable register during run time. Reconfiguration decreases the scan time for narrower windows Referring to FIG. 5, an 8 megahertz clock pulse signal is produced by 8 megahertz clock 270. This produces the DCA clock pulse signal 272 which is applied to the video converter board 16 and automatic threshold board 20. An exposure sync signal 274 is received from each of the plurality of cameras 10 at the end of the exposure cycle. Reference counter 276 comprises a 4 bit counter which counts off the number of unused header pulses produced by each of the cameras. After reference counter 276 has counted the number of clock pulses from clock input 278 equal to the number of unused header pulses, it produces a signal 280 indicating the start of the valid video data. Camera pixel counter 282 comprise a 16 bit counter which produces an output 284 which starts at the beginning of the valid video data pixels and counts the number of valid pixel elements produced by the camera, e.g., 2,048 elements. Valid video detector 286 comprises a latch for producing an output 288 which comprises a level signal indicating the presence of valid video pulses. Reference counter 276 also produces an exposure start signal 290 which is used to start exposure timer 292. Exposure timer 292 counts clock pulses on input 294 and produces an output 296 beginning at the time the exposure sync signal starts and counts out a period of time for exposure of a camera. Exposure timer 292 is coupled to the system bus 64 by way of connector 298 to load the exposure time from software. The exposure timer is set to count out a period which properly exposes the camera for maximum contrast. Exposure pulse generator 300 produces an output 302 comprising an exposure pulse signal which is applied to the cameras to initiate the exposure cycle.

The exposure pulse generator 300 is controlled by several input signals. Camera pixel counter 282 produces a camera terminate signal 304 indicating the end of the valid video data. In other words, the camera pixel counter 282 cycles through its count and at the end of its count it produces a camera terminate pulse 304 which is applied to latch 306. Latch 306 produces an output 308 indicating the end of the camera scan. Exposure pulse generator 300 latches the exposure timer pulse 296 to produce an output 302 comprising an exposure pulse which lasts for the count time of the exposure timer 292 as indicated by output 296. Exposure start pulse 310 ensures that the exposure pulse generator latch 300 is enabled. Input 308 to exposure pulse generator 300 ensures that the data from the previous exposure period has been clocked out from the camera storage registers. Both the exposure pulse 302 and the valid video pulse 288 are applied to merge counter 312.

Exposure pulse 302 functions to reset the merge counter 312 for the exposure of each new camera. The valid video signal 288 enables the start of merge counter 312 which counts the clock pulse signals applied at input 314. Merge register file 316 receives and stores merge values from software through connector 318. Merge register file 316 loads the merge register value into merge counter 312 such that when the merge count loaded into merge counter 312 is reached, an output signal 320 is produced.

The merge register values entered by software into the merge register file are determined by visual observation of the data upon setting up of the machine. The plurality of cameras 10 are aligned so that they overlap a small viewing area of the document. This is necessary since it is virtually impossible to mechanically align the cameras such that neither any space nor any overlap occurs. Consequently, the cameras arc aligned with a certain amount of overlap and the data produced is then merged or stitched together such that the overlapping pixel data points are eliminated. The pixel points eliminated are the pixel data points produced at the beginning of the scan of each camera. These overlapping values or merge values are entered by visual observation through software into the merge register file via input 318. This occurs only once during the initial setup of the machine since the cameras are affixed with sufficient stability to ensure that relative movement does not occur. Since the merge values are different for each adjacent camera, 16 different merge values must be stored in merge register file 316.

The end of camera scan signal 308 is also applied to multiplex counter 320 which comprises a 4 bit counter for keeping track of which camera is currently clocking out data. It produces a 4 bit address signal 322 which is applied to the merge register file 316 to address the merge register file for the camera which is being clocked out. The 4 bit camera signal is also applied to last camera detector 324 which comprises a 4 bit comparitor and indicates when the last camera has initiated clocking out of data. It produces an output 326 which is applied to end of line scan latch 328 which comprises a latch and combinational logic which combines the end of camera scan signal 330 with the last camera detector signal 326 to produce an output 332 indicating that the last camera has finished clocking out data. This signal is applied to interrupt controller 334 which produces an interrupt control signal which synchronizes the motor drive signal. The interrupt signal is applied to the system bus 64 by way of connector 336.

The output of merge counter 312 comprises a clock signal indicating the time during which valid video pulses are present so that header, trailing and merge pixels can be eliminated. Window open detector and sample clock generator 334 function to eliminate other unwanted pixels.

Occasionally, it is desirable to eliminate certain pixels from the output data. For example, the present invention may provide a scan width of 40 inches. The operator, however, may only desire to scan 20 inches of the total 40 inches. Menu driven software provides the capability of entering a start value for the scanning width and a total scan width value. The start value is loaded into first window counter 336 by way of connector 338 connected to system bus 64. First window counter loads the number of pixels from software that are not desired to be viewed at the front end of the scan line. Similarly, window width counter 340 loads in the number of pixels that are desired to be viewed by way of connector 342 to system bus 64. Input 344 to first window counter initiates the count of first window counter 336. First window counter 336 counts up to the number loaded into first window counter 336 by way of connector 338 from software equal to the number of pixels that are not desired to be viewed and produces an output 346 to enable window open detector and sample clock generator 334 to clock through input 320. Window width counter 340 receives a pulse from window first counter 336 by way of connector 348 to initiate a counting cycle in window width counter 340. When window width counter reaches the value loaded in for the window width by way of software via connector 342, window width counter 340 produces an output 350 which disenables the window open detector and sample clock generator 334. Window open detector and sample clock generator essentially comprises a gate which is enabled by input 346 and disenabled by input 350. Consequently, the output 352 of generator 334 comprises a clock signal which is applied to the automatic threshold board 20 or spatial compressor board 18 indicating the desired period for clocking out data pulses.

Scan control status registers and logic 354 comprises a register for storing a programmable number loaded from software via connector 356 to indicate the initiation of a scanning process at a camera other than camera one. This number is applied to multiplex counter 320 by way of connector 358. Single line synchronizer 360 comprises a device for generating only one scan line during certain testing procedures.

Line scan delay timer 362 is loaded with a software programmable delay period by way of connector 364. Line scan delay timer 362 receives a line terminate signal from the output of last camera detector 324 and the end of camera scan signal on connector 368 to indicate the end of the scanning period of the last camera. Line scan delay timer 362 then produces an escape signal 370 which enables end of line scanner latch 328 to produce an end of line scan signal 332 at the end of the programmable delay period. Consequently, after the last camera has been scanned, a programmable period can be entered which comprises a dead time at the end of the scanning cycle of each line. This dead time essentially slows down the scanner and allows for the programming of an average data rate to allow the host computer to adequately capture the data being produced. In this manner, the present invention can function as a variable speed scanner by simply programming dead time into the line scan delay timer 362 and thereby control the average rate at which data is being produced by the device.

The camera controller board 22 also includes a scanner output interface device 372 which functions to control the scanner from read and write signals entered through software.

Figure 6:
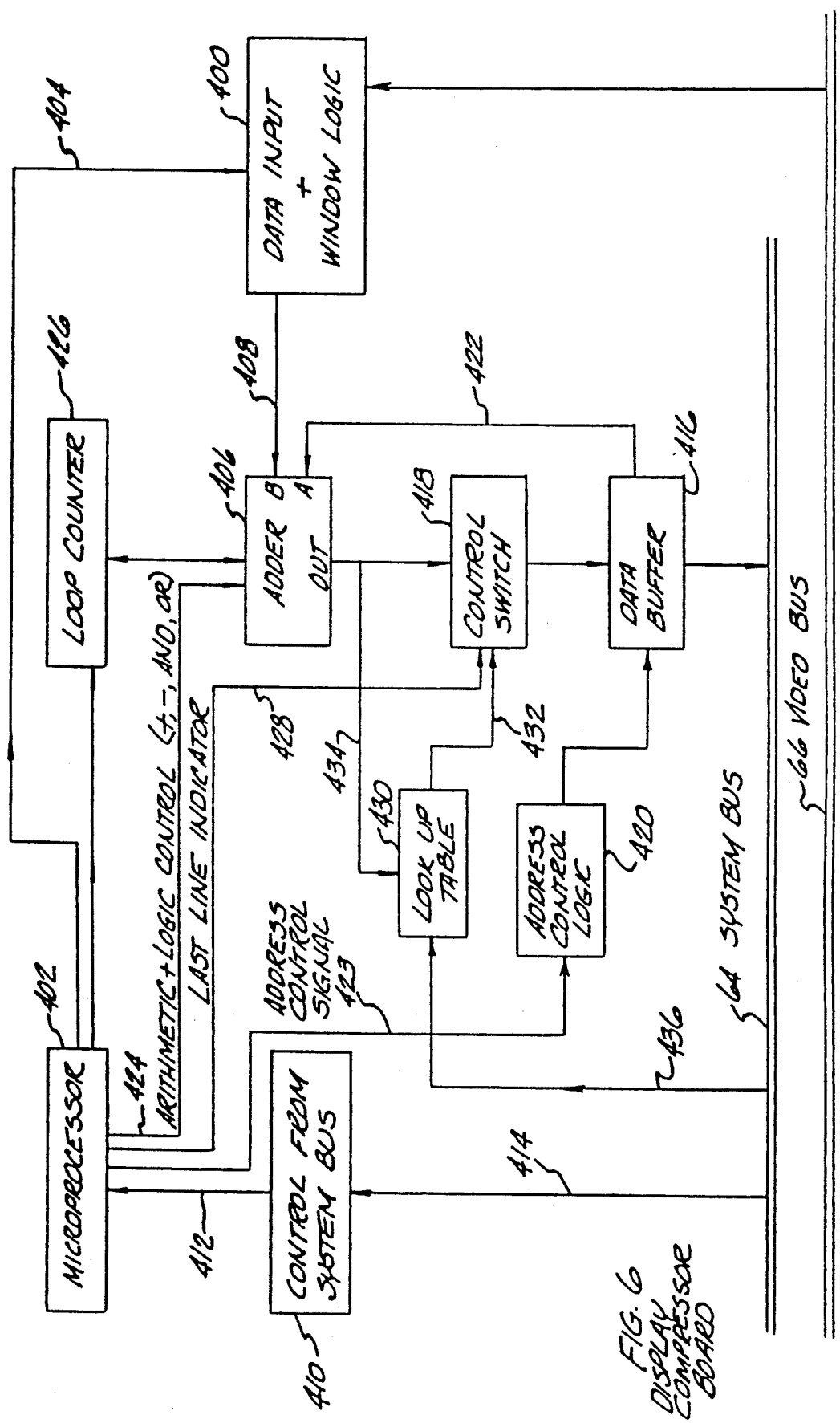
FIG. 6 is a detailed block diagram of the display compressor board.

FIG. 6 comprises a detailed block diagram of the display compression board 26. Video data from video bus 66 is received by data input and window logic 400. Data input and window logic includes a first in and first out device which synchronizes data to 10 megahertz from the 8 megahertz utilized on the video bus 66, and also functions to window the data in accordance with windowing instructions received from microprocessor 402 via connector 404. Microprocessor 402 provides logic control signals to control logic within data input and window logic device 400 to select a specified window to be displayed on monitor 28.

Microprocessor 402 receives information from controller device 410 via connector 412. Control device 410 receives control signals from system bus 64 via connector 414 and functions as a controller for the microprocessor 402. Input data is applied to adder 406 and fed to data buffer 416 via control switch 418. Data buffer 416 stores the data in address locations controlled by address control logic device 420 in response to an address control signal 422 received from microprocessor 402. This data is also applied to adder 406 on input A by way of feedback loop 423. Hence, each video data pixel which is applied to adder 406 from data input and window logic 400 via input 408 is added to the cumulative value of the preceding pixel data points. Input 424 from microprocessor 402 controls the arithmetic and logic control function of adder 406 to cause adder 406 to either add, subtract, or perform any other logic control function which it is capable of performing. Adder 406 continues to accumulate pixel data points up to a predetermined number stored in loop counter 426. When the numbers stored in loop counter 426 has reached the value of the accumulated data, the accumulated date signal is stored in data buffer 416 by a signal received from address control logic device 420. Adder 406 is zeroed out and restarts the process of accumulating data.

This function continues until a series of compressed data points for a single raster line is stored in data buffer 416. Subsequently, the next line of data raster points is accumulated and added to corresponding accumulated data raster points on the previous line. This process continues until a last line for a particular data compression factor is reached. The last line of data for a particular compression factor is the line of data equal to the data compression factor number. For example, if data is being compressed by a factor of 8, the last line of data for the data compression factor is line 8. Similarly, if data is being compressed by a factor of 16, the last line of data is the data from line 16. This provides a square lattice of compressed data points.

When the last line of data is transmitted from adder 406, microprocessor 402 produces a last line indicator signal 428 which is applied to control switch 418 to transmit the output from look-up table 430 to data buffer 416, rather than the output of adder 406. Look-up table 430 comprises a thresholding device which utilizes the output signal provided by adder 406 to address a specified location within the look-up table 430. Data values stored in look-up table 430 comprises a zero or one, or can comprise a gray level signal in accordance with the address signal provided by adder 406. For example, if data is being compressed by a factor of 8 in two directions, the maximum signal which could be produced by adder 406 on the last line for each data point would be 64. Data stored in look-up table 430 could indicate a one output for any input on line 434 greater than 32 and zero for a data value from zero to 32.

The output of the look-up table is applied to control switch 418 via connector 432. Control switch 418 applies these data points to data buffer 416 for storage at address locations provided by address control logic 420. Look-up table 430 is programmed with data from the system bus 64 by way of connector 436. It should be pointed out that address control logic 420 controls the data buffer 416 such that data is compressed in the x-direction as received from data input device 400 and added to corresponding data points in the y-direction in a cumulative manner so that when the last data line is reached, a single line of data in the x-direction is produced which is the accumulation of corresponding data points in the y-direction for a specified number of lines equal to the data compression factor.

For example, if data is being compressed by a factor of 8, the display compression board illustrated in FIG. 6 provides a series of data points in the x-direction which are equal to the sum of each set of 8 data points. The cumulative value of the first 8 pixel points of the second line of data is added to the cumulative value of the first 8 pixel points of the first line of data. This process continues so that the second line is a series of cumulative data points in the x-direction which is an accumulation of the corresponding points of the first and second lines. This process continues until the 8th line is reached which is a series of data points in the x-direction equal to the sum of the corresponding points for the 7 previous lines plus the 8th line. This last line of data is thresholded in look-up table 430 as indicated above.

Consequently, the data can be compressed by a data compression factor loaded into microprocessor 402 to provide a data compression suitable for display on the limited number of pixel elements of the monitor. Additionally, windowing logic can function to display only certain portions of the scanned data with, or without any compression. These compressed data points are stored in data buffer 416 to provide a raster line of compressed data.

Frame buffer 30 (FIG. 1) comprises an interface between display compression board 26 and monitor 28 and functions to convert the compressed data produced by display compression board 26 to a form suitable for display on monitor 28. A frame buffer suitable for the use of the present invention comprises the Ikier Technology, Inc. Model HRG 3000 High Resolution Graphics Controller, available from Ikier Technology, Inc. 7 Oak Park, Bedford, Mass. 01730. It operates in conjunction with software signals provided from the system bus 64. Video format functions are under program (software) control from system bus 64. The frame buffer allows programming of horizontal and vertical sync sizes and provides the information in an analog video signal suitable for display on the monitor. The frame buffer 30 also includes a direct memory access controller device which allows direct communication of data from the data buffer 416 (FIG. 6) of display compressor board 26 over system bus 64 to frame buffer 30. This greatly increases the data transfer rate since Z80 processing board 24 does not have to control the process of transferring data and can be freed to perform other functions. Each compressed raster line of data stored in data buffer 416 (FIG. 6) is transferred via the direct memory access controller of the frame buffer 30 for storage in buffer memory in frame buffer 30. In this manner the data can be transferred at a high rate of speed to greatly increase the data processing speed of the document scanner system illustrated in FIG. 1.

I/O board 32 comprises an interface board for the system bus 64 to various document sensors and control devices utilized in accordance with the present invention. Scanner I/O board 32 interfaces all analog and miscellaneous digital signals with the scanner system. The I/O board 32 is a board which is compatible with system bus 64 and utilizes on-board programmable interrupt controllers and status registers. The board interfaces with all of the analog signals except the video analog signals of the scanner system. The analog signals are derived from the document position sensors and power supplies. Signals from the control board are also received and processed by I/0 board 32. Digital stepper motor signals for stepper motor 12 are also generated by I/O board 32. I/O board 32 receives input signals from document sensor 38 by way of connector 440 which indicates the presence of a document in the feed plate and produces a signal indicating that the scanner should turn the lights on and ramp up the motor. Document sensor 38 also produces a signal indicating that the document is located in front of the platten. In/out board 32 produces a signal to turn on the cameras when the document has travelled two inches further.

Jam sensor 34 is connected to I/O board 32 by way of connector 442. Jam sensor 34 produces a signal indicating when the occurrence of a jam in the document moving system. Light sensor 40 is connected to I/O board 32 by way of connector 444 and produces a signal indicating the failure of one or more light bulbs. Heat sensor 37 indicates an excessive temperature level in the light box or card cage. Power supply failure sensor 36 provides a signal over connector 446 to I/O board 32 indicating the failure or production of out-of-tolerance levels of power supply module 48. Control board 45 produces an output 448 indicating operation of the cursor control 44 and enter button 46. Opaque/clear sensor 37 indicates the scan width of the document by operation of 24 LED's aligned in the x-direction along the scanner sensor. I/O board 32 controls the operation of stepper motor 12 via connector 450 which transmits stepping motor pulses to stepping motor 12. Lighting array 452 is controlled by I/O board 32 via connector 454 to turn on and off the lights for illumination of the document. Stepping motor 12 receives both forward and reverse stepping pulses over connector 450 to move both forward and backward. Additionally, a single bit is used to turn on and off the stepper motor to conserve power during non-use.

I/O board 32 utilizes a series of registers for various control functions. Four registers are used for programming the programmable interrupt controller. Two locations are reserved for the interrupt vector which is loaded from the programmable interrupt controller and the interrupt vector that is generated. I/O mapped registers are used to access the key pad status and error condition status. I/O mapped registers are used to load the counters and the direction of movement of the stepping motor 12 and enable the LED's to display the scan width zone. An Intel 8259 A programmable interrupt controller is used on I/O board 32 to control the interrupt functions. Two controllable interrupt controllers are used in a cascade configuration to prioritize the 13 different interrupts of the I/O board 32. Each programmable interrupt controller controls eight interrupt lines. To cascade the programmable interrupt controllers, a slave pic generates an interrupt into a master pic. In a fully expanded system of interrupts, there are eight slave pics, each slave activating one of the eight interrupt lines on a master pic. This requires nine pics to control 64 interrupts. On the I/O board 32 the pics are programmed by software and by hardware. The following interrupts are controlled by the master interrupt controller: 1) every depression of the up arrow key generates the up arrow interrupt; 2) every depression of the down arrow key causes generation of the down arrow interrupt; 3) every depression of the left arrow key causes generation of the left arrow interrupt; 4) every depression of the right arrow generates the right arrow interrupt; 5) every depression of the select key generates the select interrupt; 6) an interrupt signal is generated at the leading edge of detection of the over temperature signal; 7) an interrupt signal is generated when the slave interrupt controller has an interrupt.

The following interrupts are generated by the slave interrupt controller: 1) power failure—detection of the positive edge of the power failure signal causes generation of this interrupt; 2) light failure—detection of the leading edge of the light failure sensor signal causes generation of this interrupt; 3) document present—detection of the document present signal causes generation of this interrupt; 4) document start—detection of the leading edge of the document start signal produces this interrupt which indicates that the document has just started entering the platten area; 5) document start—detection of the negative edge of the document start sensor signal causes generation of this interrupt which indicates that the document is leaving the entrance of the platten; 6) document end—detection of the positive edge of the document end level sensor signal generates this interrupt which indicates that the document is just entering the exit area of the platten; 7) document end—generation of the document end sensor signal causes generation of this interrupt signal which indicates the document is leaving the exit area of the platten.

FIGS. 7 through 25 disclose flow charts for the software of the present invention. The software is organized into the following tasks:
(1) task supervisor,
(2) system services:
 a) buffer manager,
 b) intertask communications handler,
 c) timer manager,
 d) byte I/O handlers,
 e) EE PROM handler,
(3) initialization module,
(4) operator's console manager:
 a) display driver,
 b) key pad handler,
(5) camera controller interface task,
(6) auto thresholding board interface task,
(7) display compression interface task,
(8) frame buffer interface task,
(9) end user interface task,
(10) spatial compressor board interface task,
(11) document feed controller task,
(12) interrupt handler's module.

Figure 7:
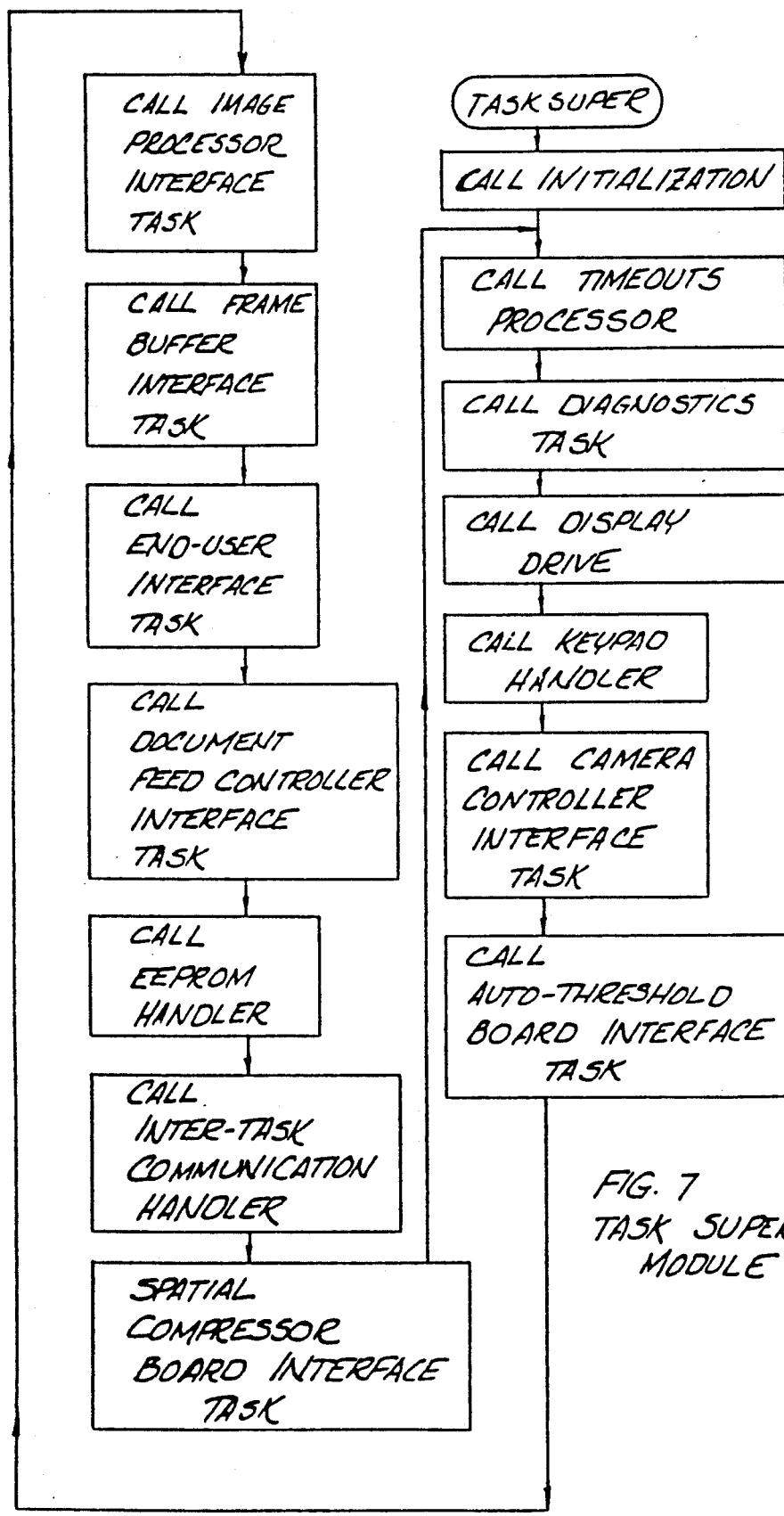
FIGS. 7-25 are flow charts disclosing the software operations of the present invention.

The task supervisor is the executive of the system and serves as a driver for the tasks which service the document scanner illustrated in FIG. 1. The task supervisor first invokes the initialization module to perform various hardware and software initializations and then continually loops through the task control table calling the tasks consecutively as they are scheduled to execute. The tasks performed by the task supervisor module are illustrated in FIG. 7.

Figure 8:
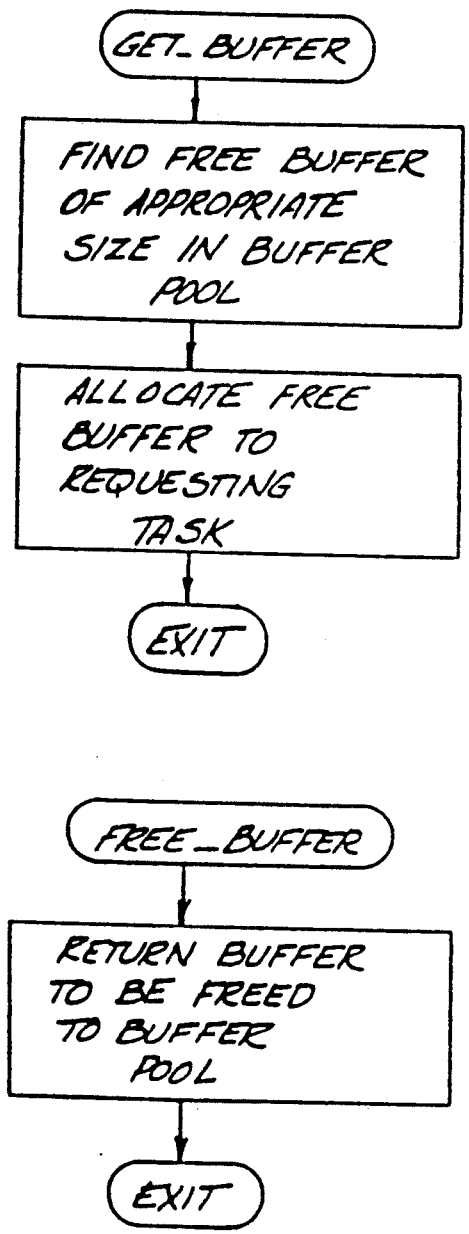

FIG. 8 discloses the task performed by the buffer manager. The buffer manager manages a global buffer pool and system RAM. Any task needing a RAM buffer must request buffer from the buffer manager and then release or free when it is no longer needed.

Figure 9:
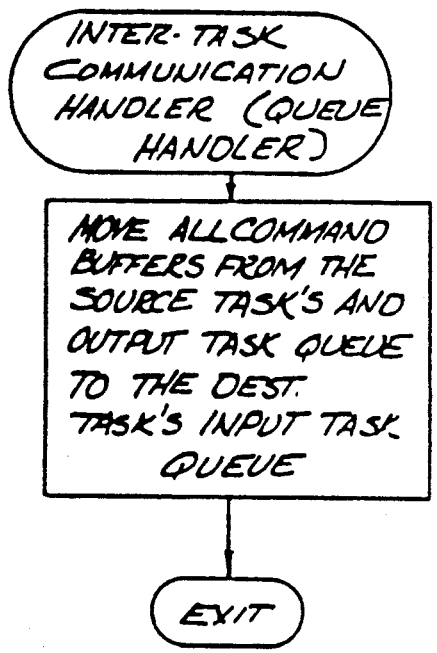

FIG. 9 illustrates the task performed by the intertask communications handler or queue handler. Communication between tasks is accomplished through the use of task queues. Each task in the system has two task queues allotted to it: (1) an input task queue; and, (2) an output task queue. The queue handler illustrated in FIG. 9 provides routines which allow tasks to add or remove messages from task queues. Any task wishing to communicate with another task builds a message for the destination task and then invokes the queue handler to add the message to the input queue of the destination task. When the destination task executes, it removes the message from its input queue and processes it.

Communication between the software (console manager) and the operator's console (key pad) is accomplished through the use of character queues. The console manager has two character queues allocated to it: (1) an input character queue; and, (2) an output character queue. The queue handler in FIG. 9 provides routines which allow the console manager to add or remove characters from the character queues. When the console manager wishes to display a menu on the operator's console, it stores the characters comprising the menu in the output character queue. Characters are then removed one at the time from the queue and transmitted to the operator's console. When an operator enters data via the key pad on the operator's console, the characters are received comprising the data and stored in the input character queue. The console manager the removes the input data from the input character queue and processes it.

Figure 10:
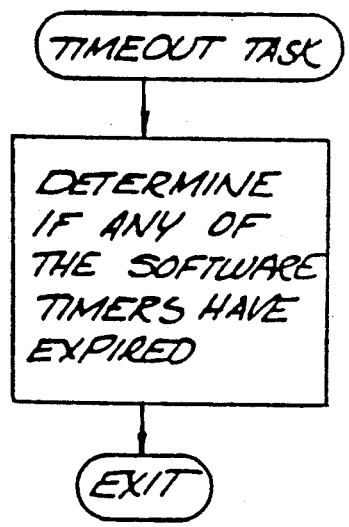

FIG. 10 discloses the task provided by the timer manager. The timer manager provides software timing functions for the task in the system. Any task requiring a software timer must use the timer manager illustrated in FIG. 10. The timer manager also monitors all the active software timers and determines when a time-out has occurred.

Figure 11:
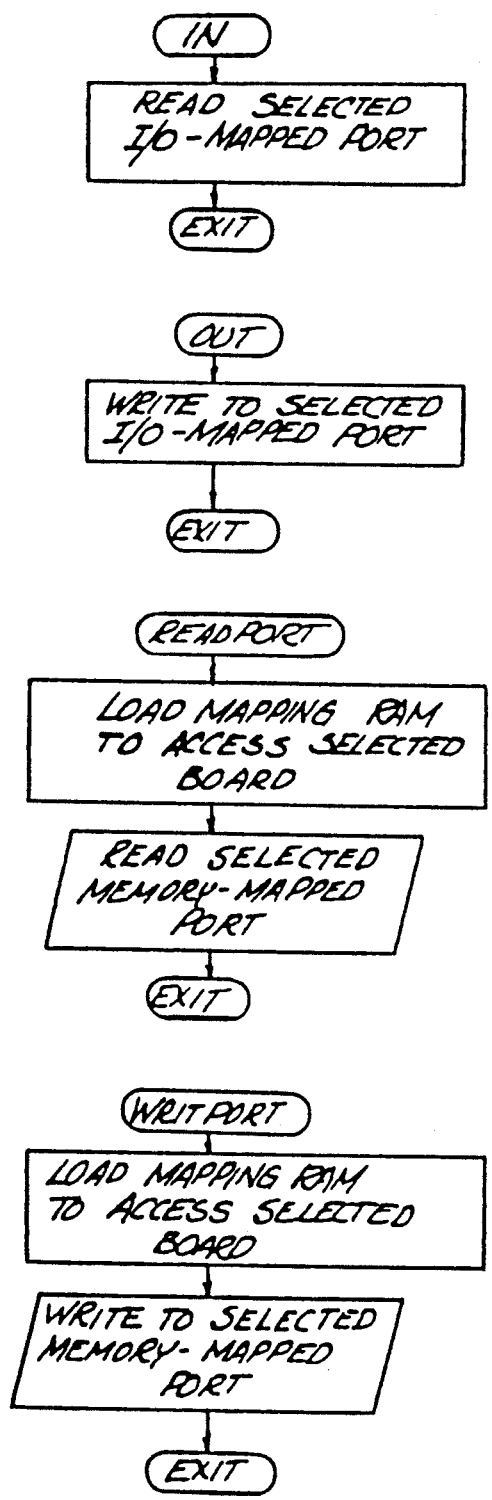

FIG. 11 illustrates the functions performed by the byte I/O handlers. The byte I/O handlers provide the I/O interface to the byte oriented devices such as memory mapped and I/O mapped ports. Any tasks requiring I/O with a byte oriented device must use the byte I/O handler.

Figure 12:
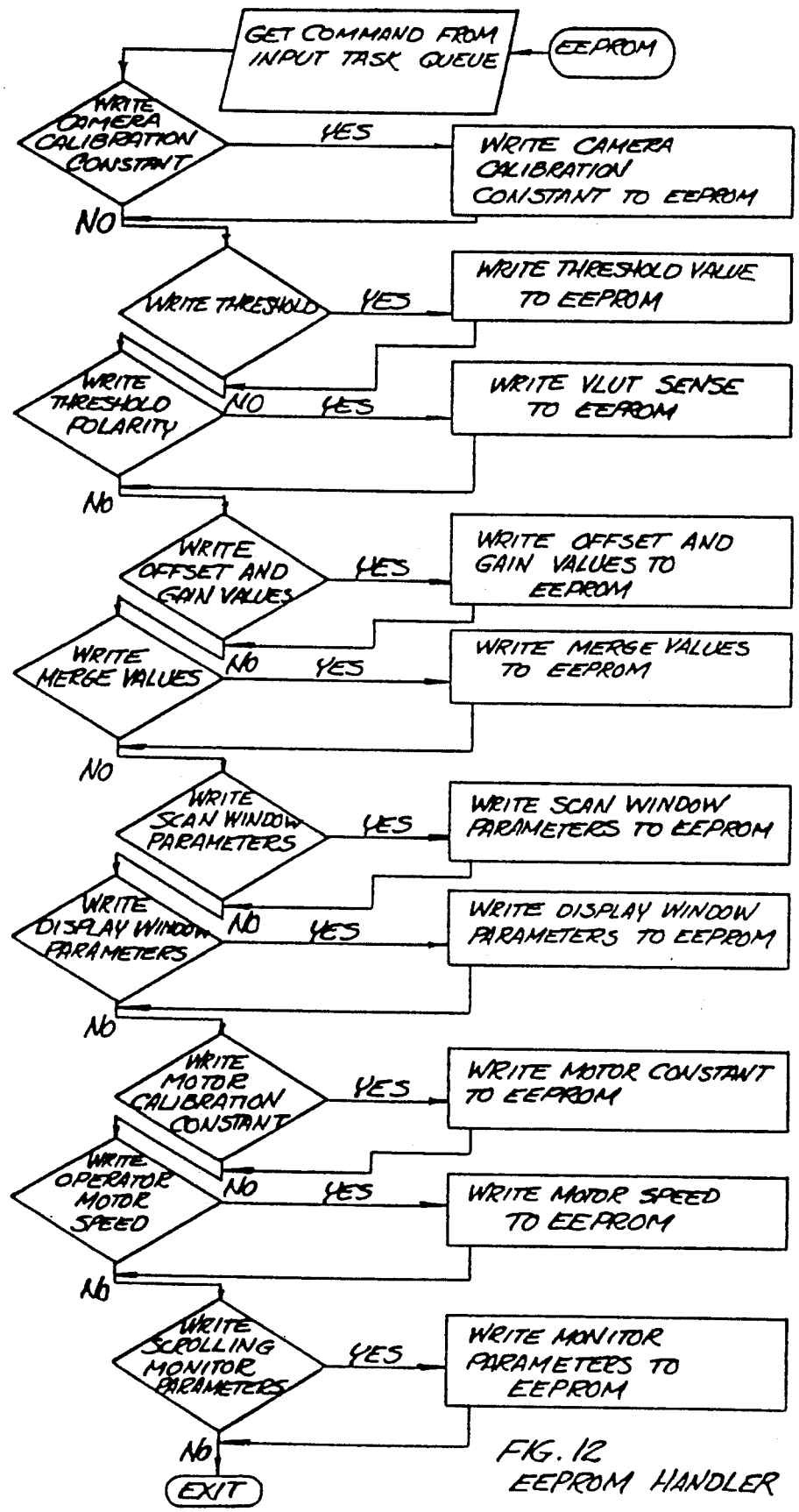

FIG. 12 discloses the task provided by the EEPROM handler. The EEPROM handler provides the interface to the EEPROM. Any task requiring I/O with a EEPROM must request service from EEPROM handler.

Figure 13:
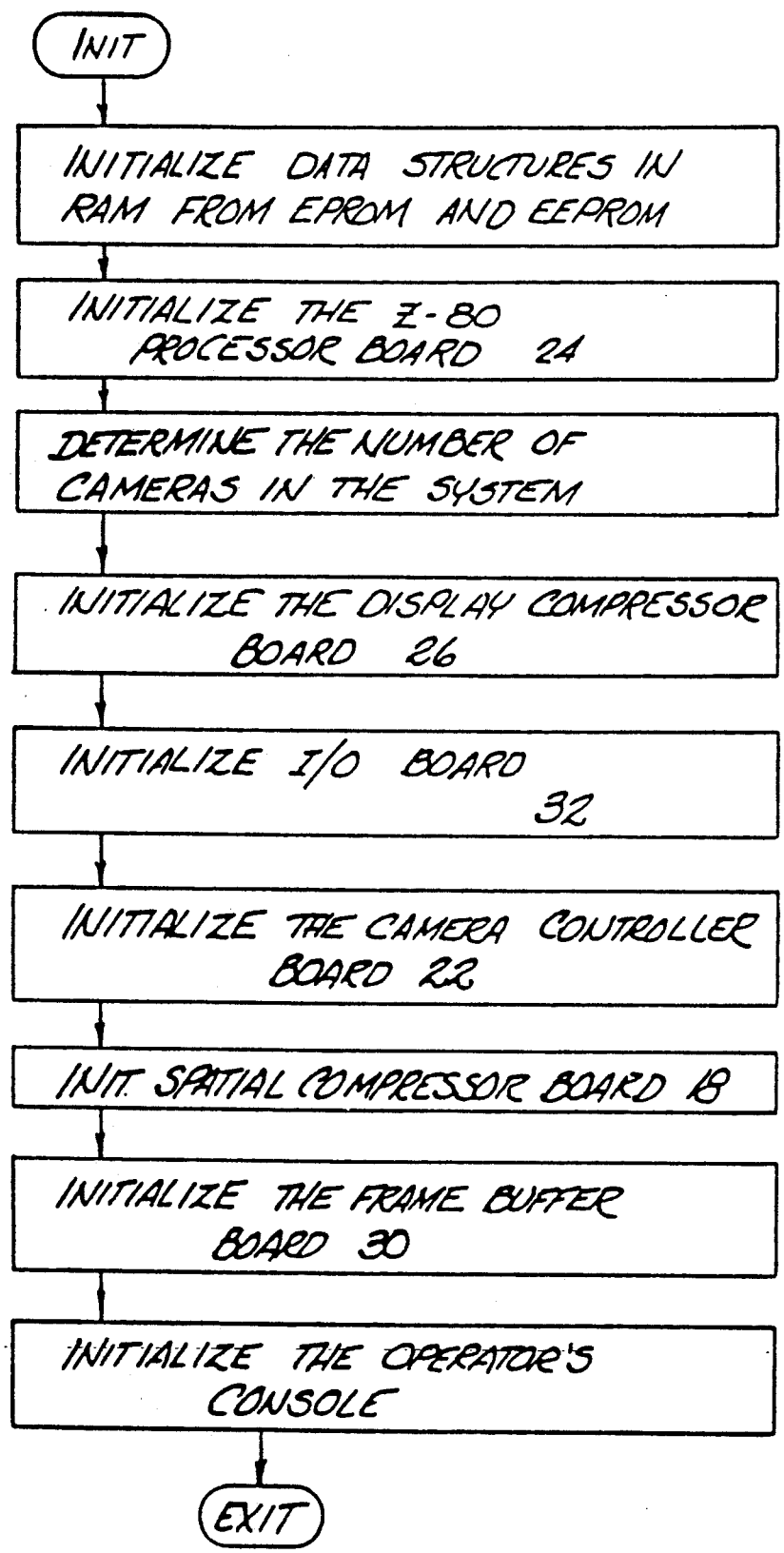

FIG. 13 discloses the task performed by the initialization module. Initialization module initializes various software data structures in RAM. It also initializes the boards in the system.

Figure 14:
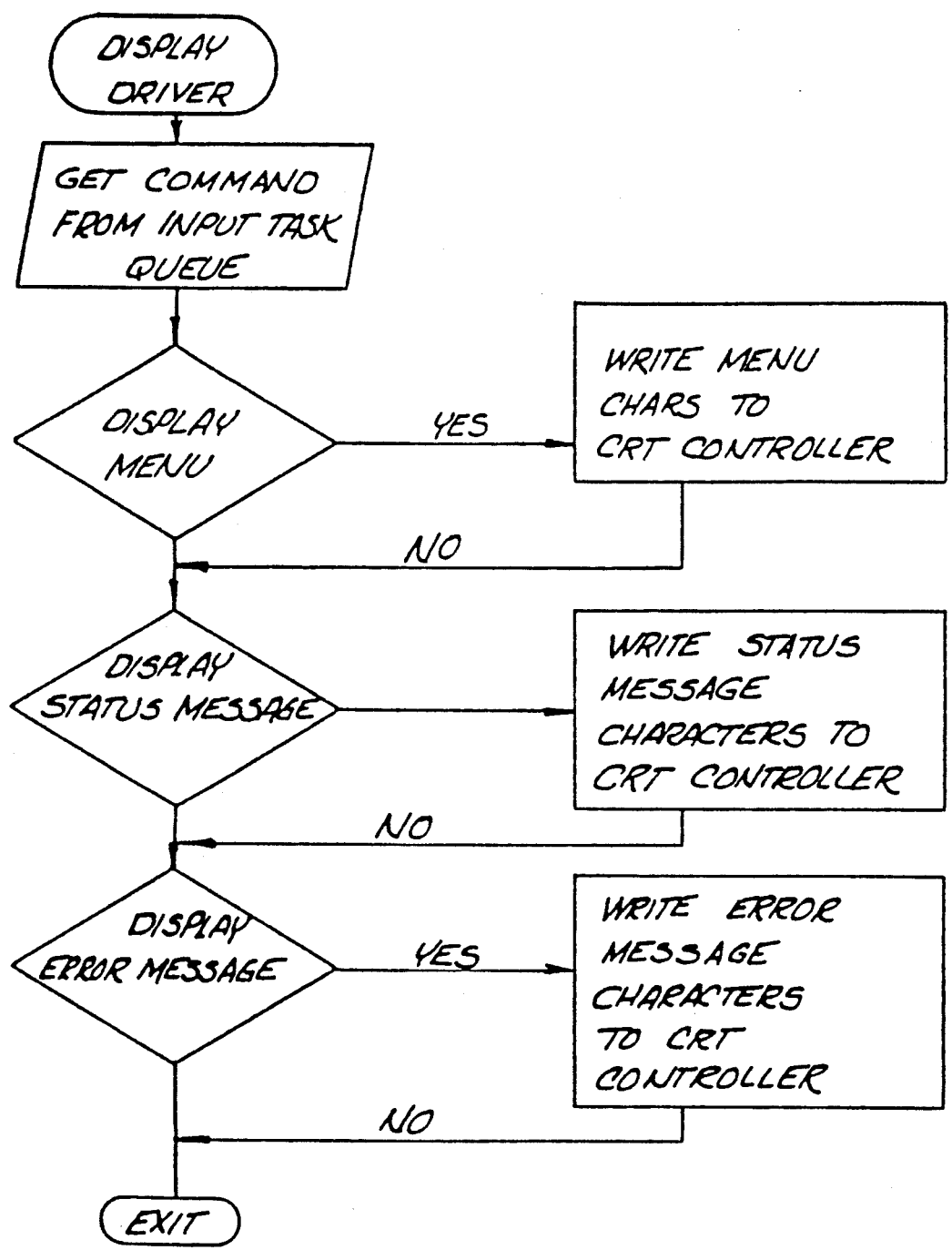
Figure 15:
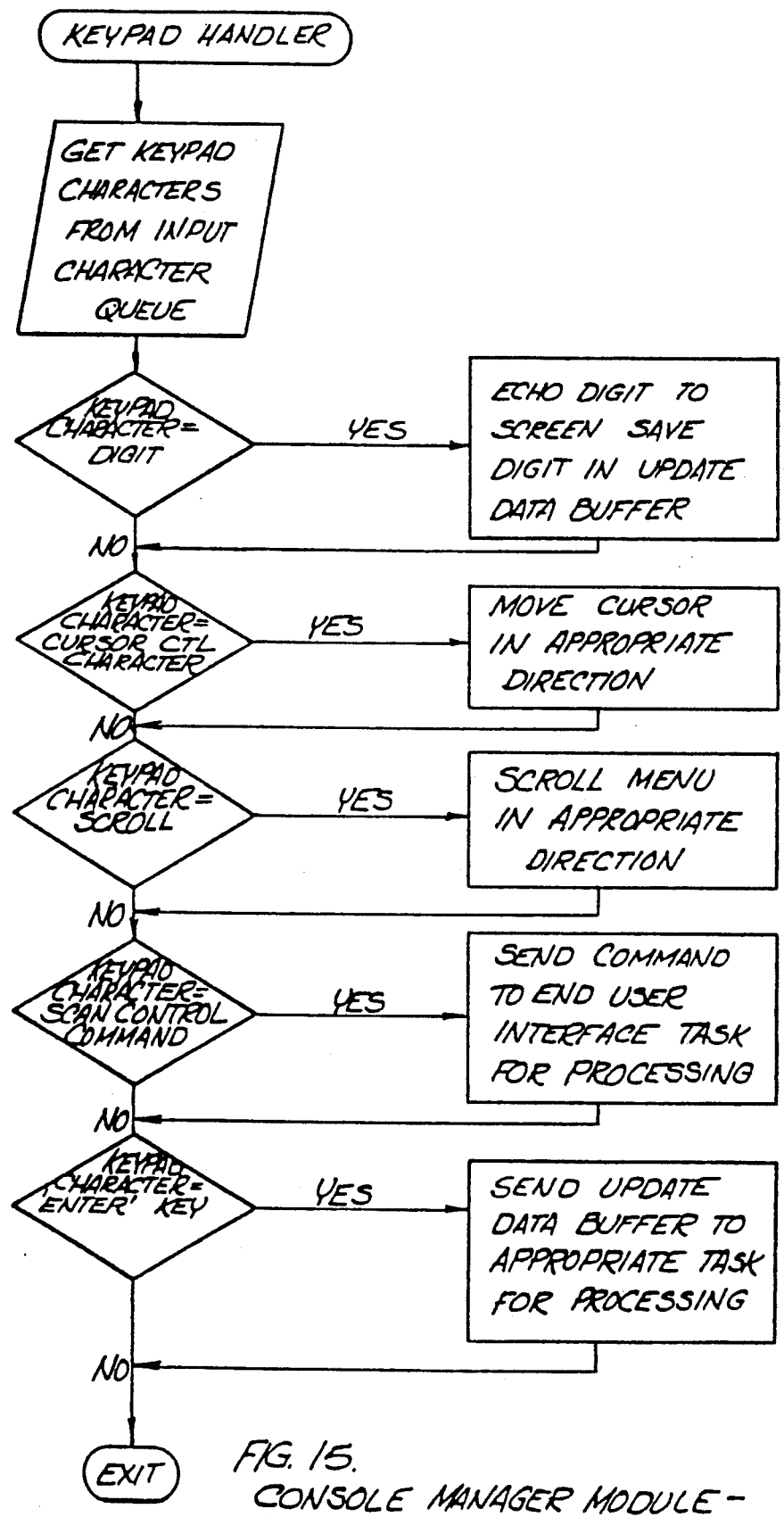

FIGS. 14 and 15 disclose tasks performed regarding the operator's console manager. FIG. 14 discloses the functions provided by the display driver of the program. The display driver functions as one of the two tasks comprising the console manager which provides the operator interface to the scanner. The display driver handles all transmissions to the operator's console including displaying of menus, error and status messages, cursor positioning and character echoing. All tasks communicate with the display driver via its input task queue.

FIG. 15 discloses the tasks provided by the key pad handler. The key pad handler receives all data input from the key pad on the operator's console including scan control commands, menu data and menu selection information. The key pad handler communicates operator inputs to an application task by building a message containing the input data and adding it to the input task queue of the destination task via the queue handler.

Figure 16:
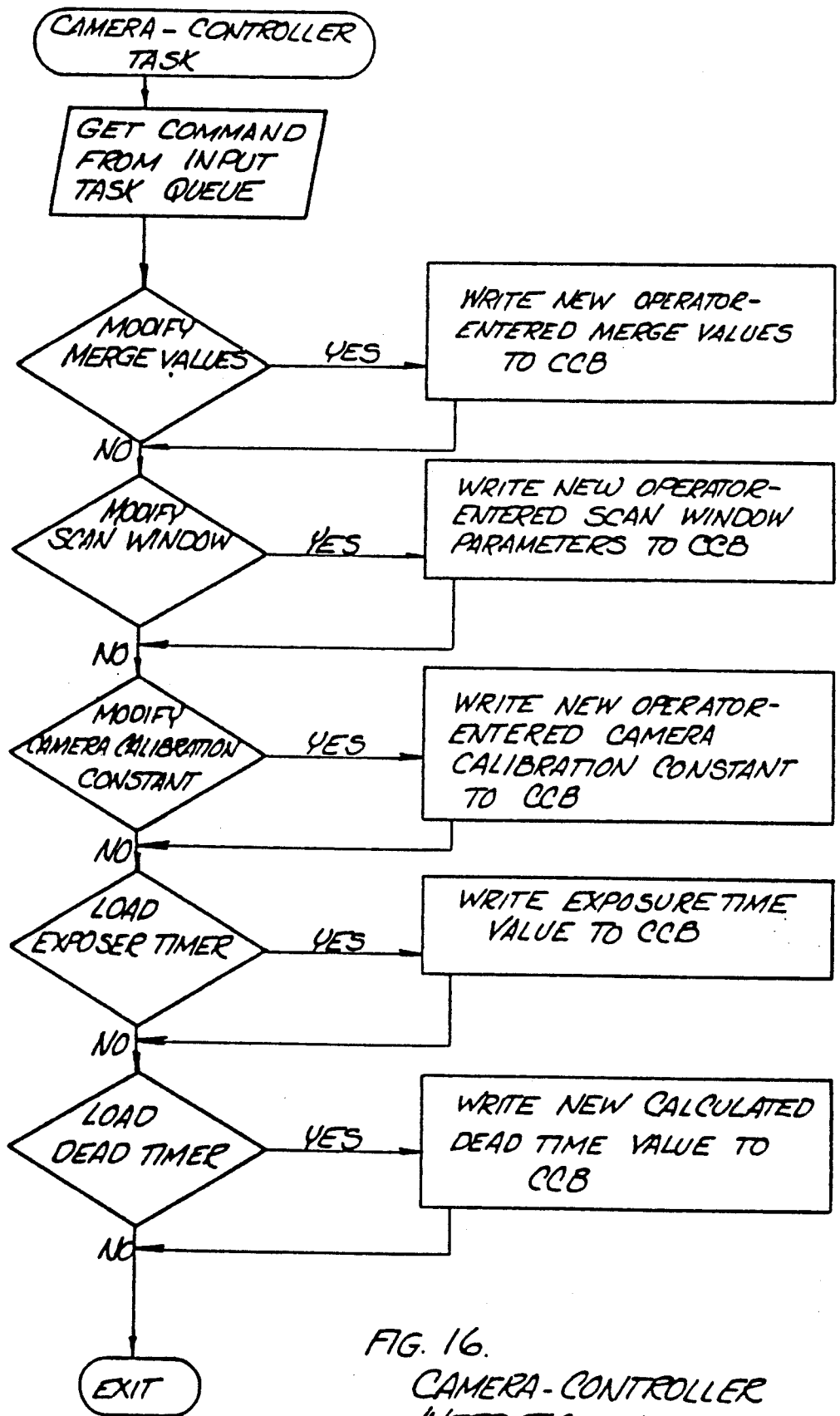

FIG. 16 discloses the camera controller interface task. The camera controller interface task provides a software interface to the camera controller board (CCB) 22. It functions by calculating the various camera parameters and loading them into registers on the CCB. The camera controller interface task also controls the scanning of the cameras.

Figure 17:
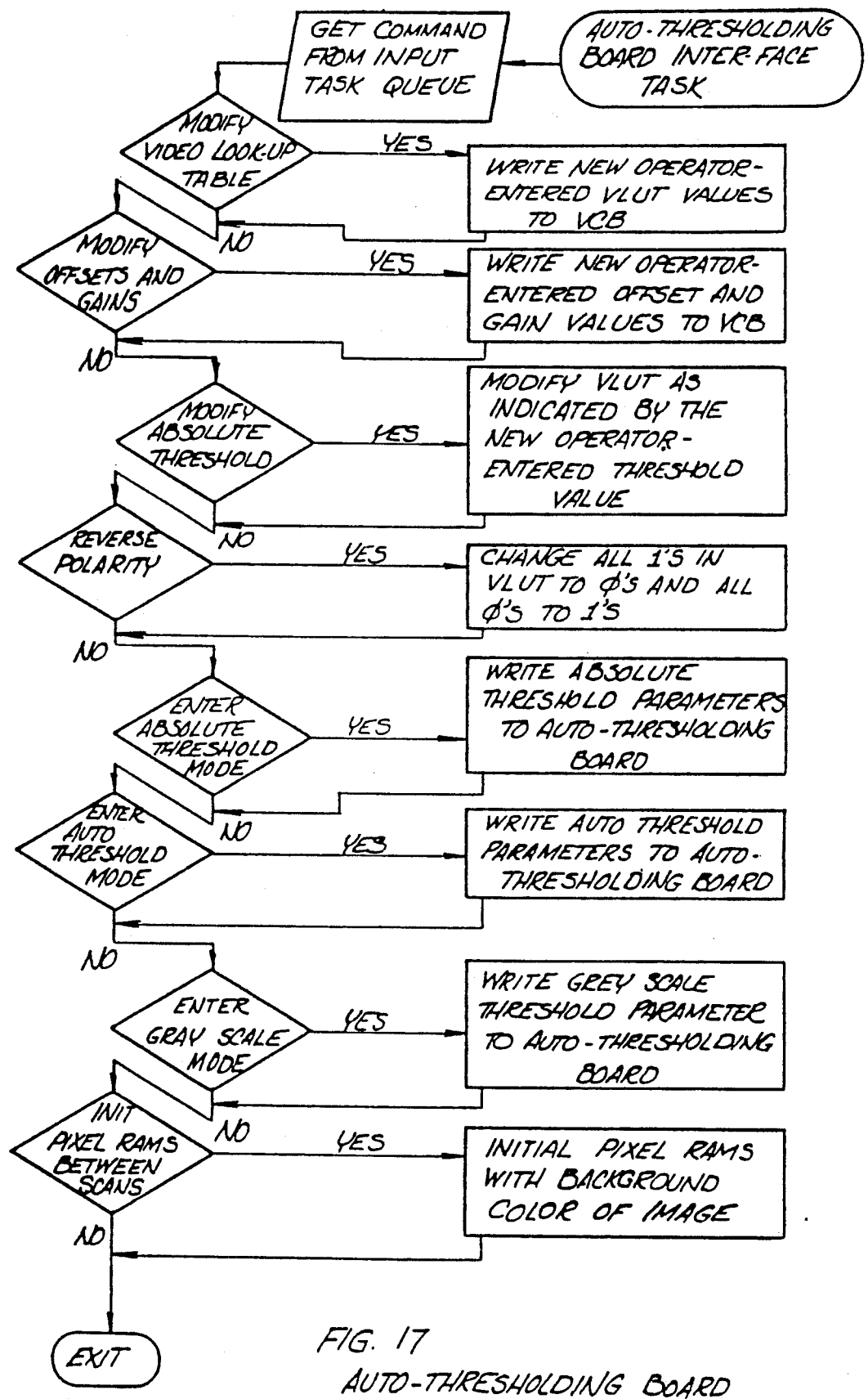

FIG. 17 discloses the auto-thresholding board interface task. The auto thresholding board interface task provides the software interface to the automatic thresholding board. It functions by loading offset and gain values into registers of the automatic thresholding board and by loading the video look-up table to result in the desired threshold to be used in digitizing the analog camera data. There are three thresholding modes available: (1) gray scale thresholding in which raw pixel data is output (no thresholding performed); (2) absolute thresholding in which an absolute threshold point is selected and each pixel threshold on the threshold value; (3) automatic thresholding wherein each pixel is thresholded differently as predicted by the values of neighboring pixels.

Figure 18:
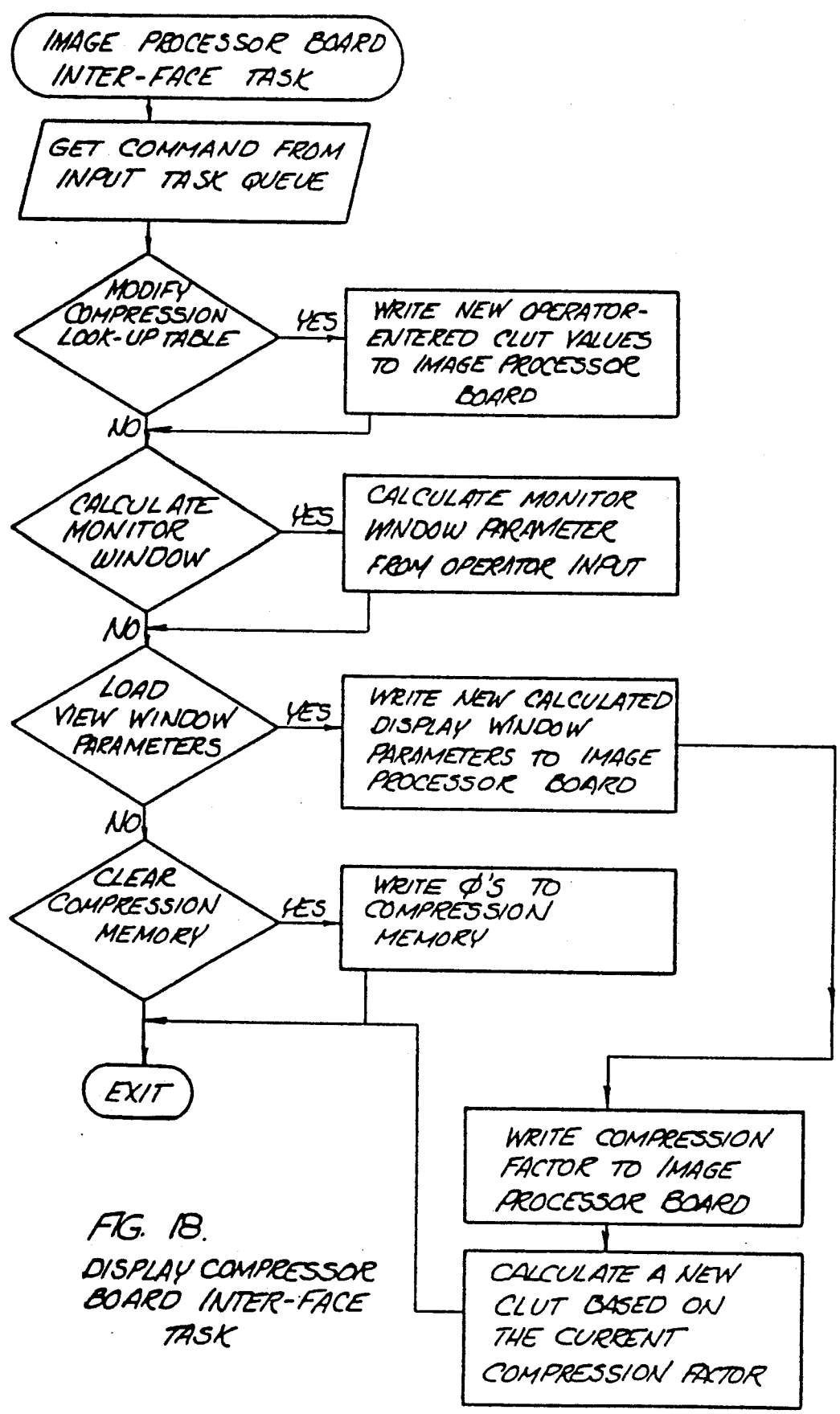

FIG. 18 discloses the display compressor interface task. The display compressor interface task provides a software interface to the display compressor board 26. It functions by calculating and loading display parameters and the compression factor into the registers on the display compression board.

Figure 19:
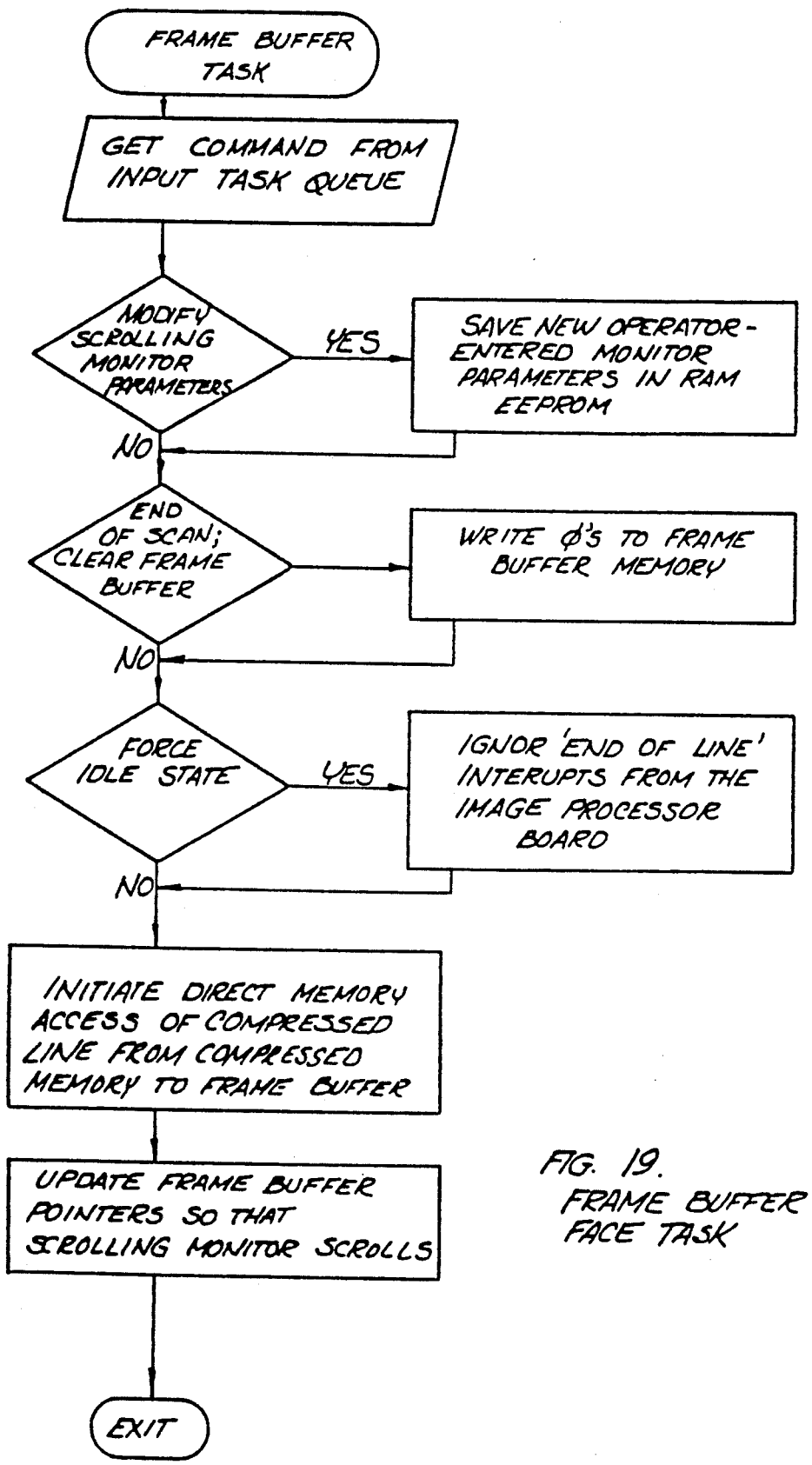

FIG. 19 discloses the frame buffer interface task. The frame buffer interface task provides the software interface to the frame buffer board 30. It controls the transfer of compressed scan data from the display compressor board 26 to the frame buffer board 30 so that it can be displayed on the scrolling monitor 28. The frame buffer interface task illustrated in FIG. 19 also controls this scrolling monitor.

Figure 20:
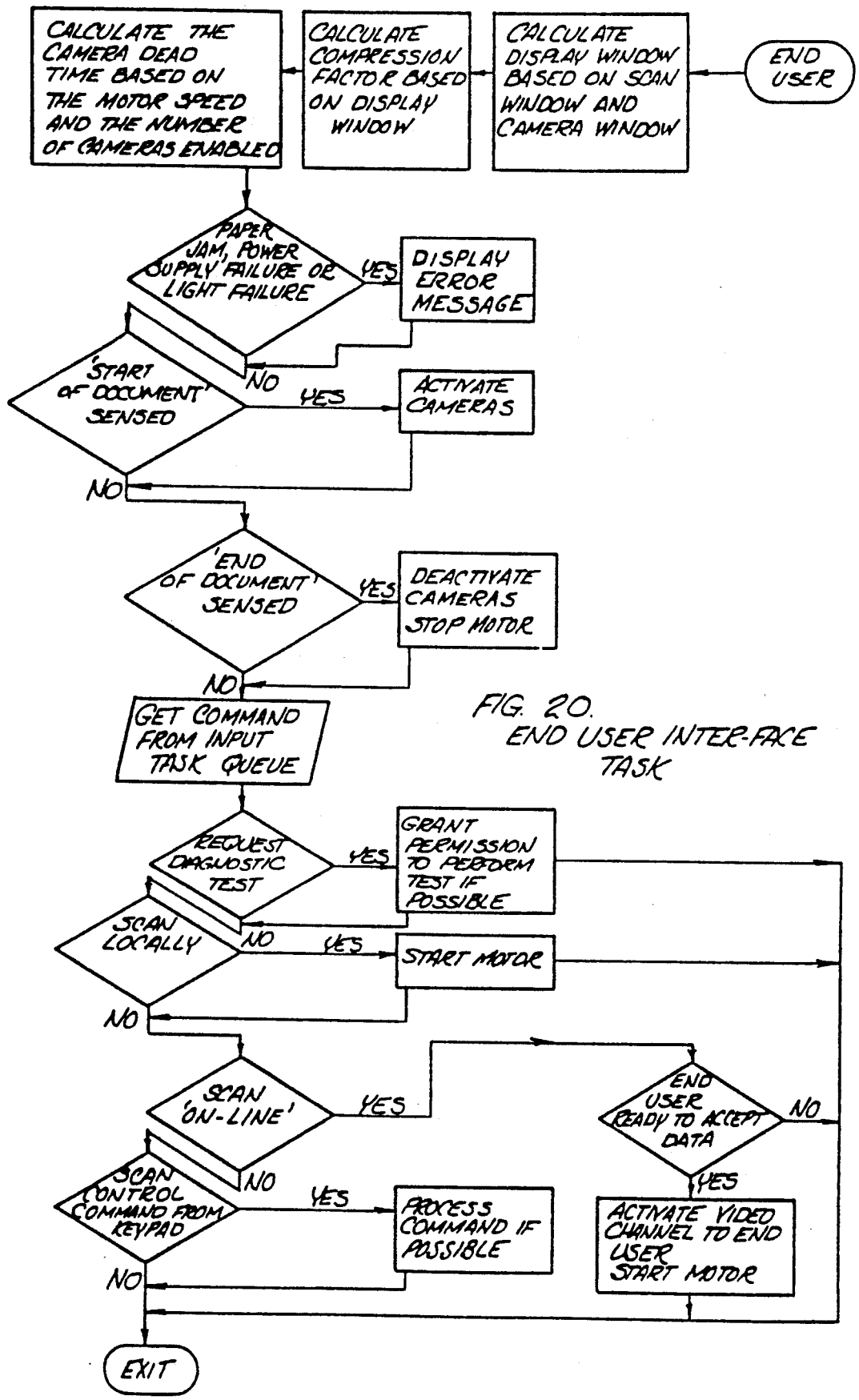

FIG. 20 discloses the end user interface task. The end user interface task is a customized module which provides the software interface to an end user computer. It also functions as the master controller of the document scanner system illustrated in FIG. 1 by controlling all activity performed by the document scanner.

Figure 21:
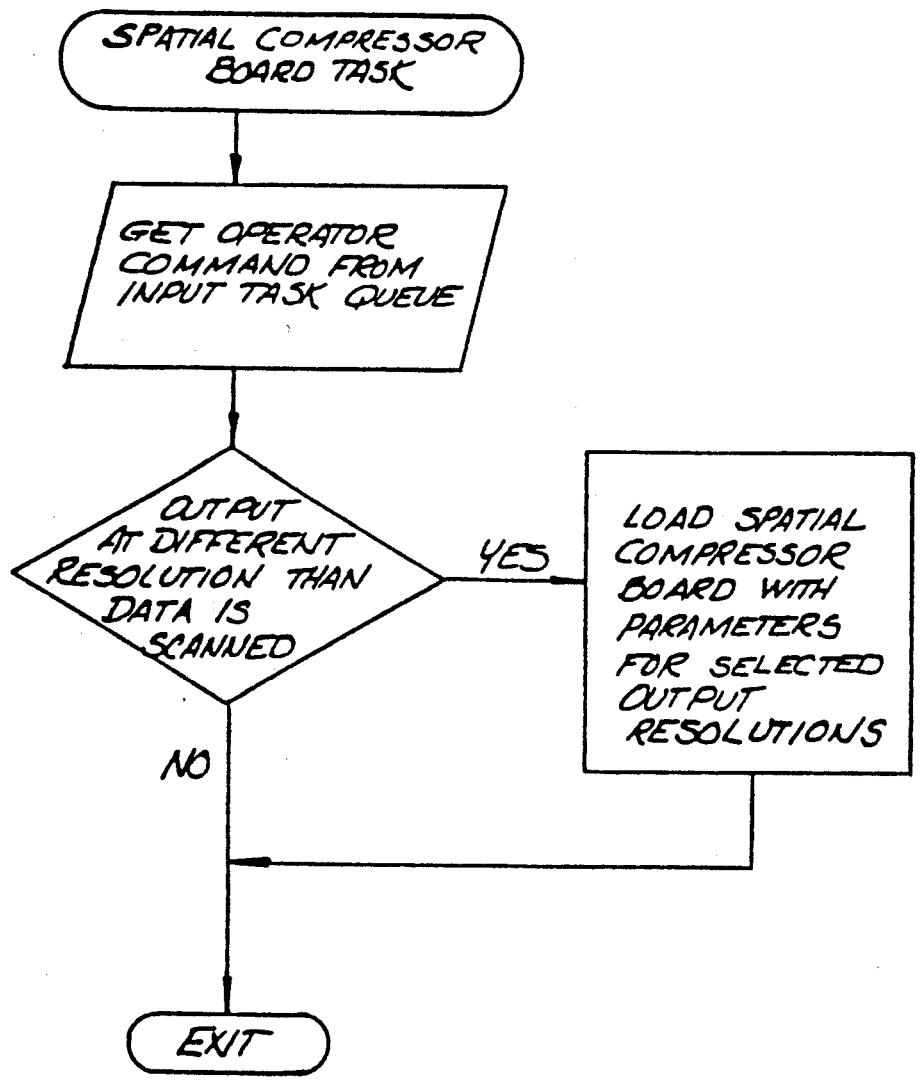

FIG. 21 discloses the spatial compressor board interface task. The spatial compressor board interface task functions to load the spatial compressor board 18 with the parameters necessary for spatial compression prior to transmission of data to the end user.

Figure 22:
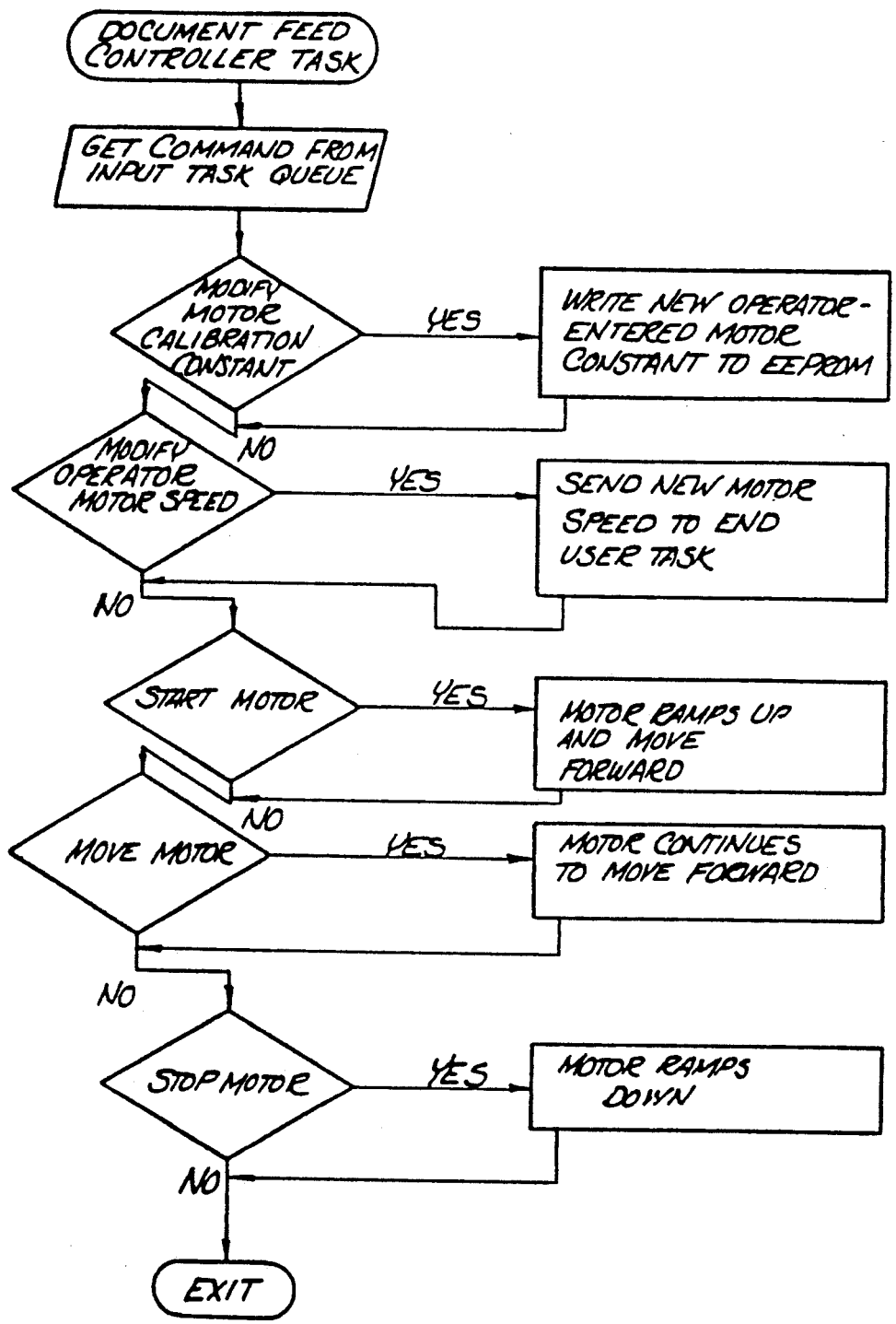

FIG. 22 discloses the document feed controller task. The document feed controller task controls the stepping motor which drives the paper transport system of the scanner.

Figure 23:
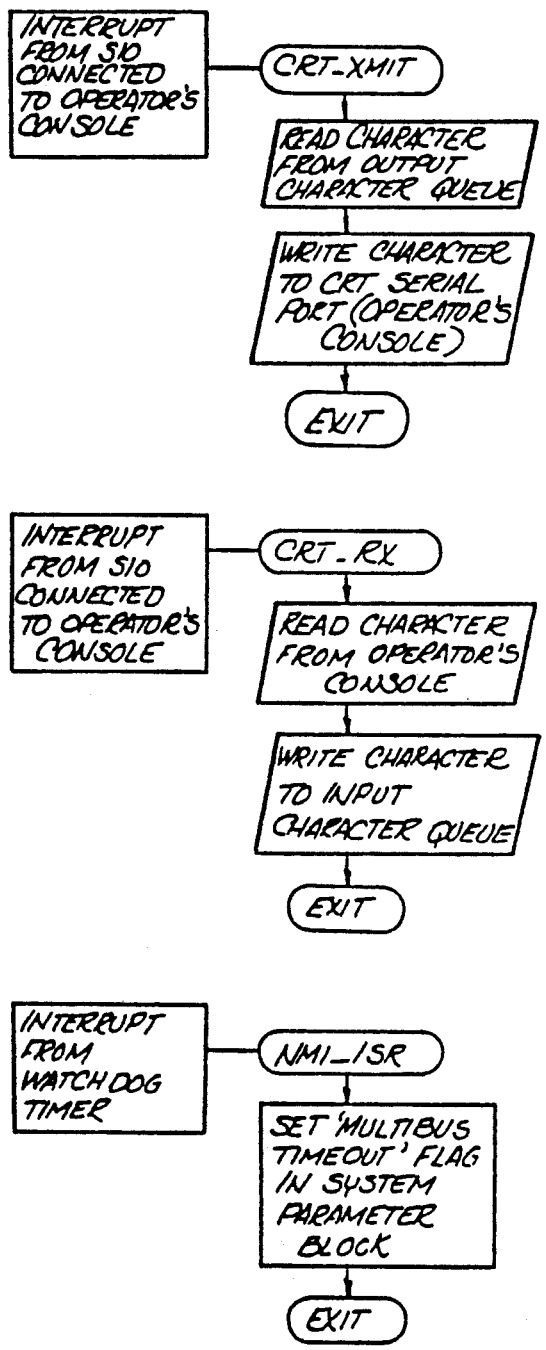
Figure 24:
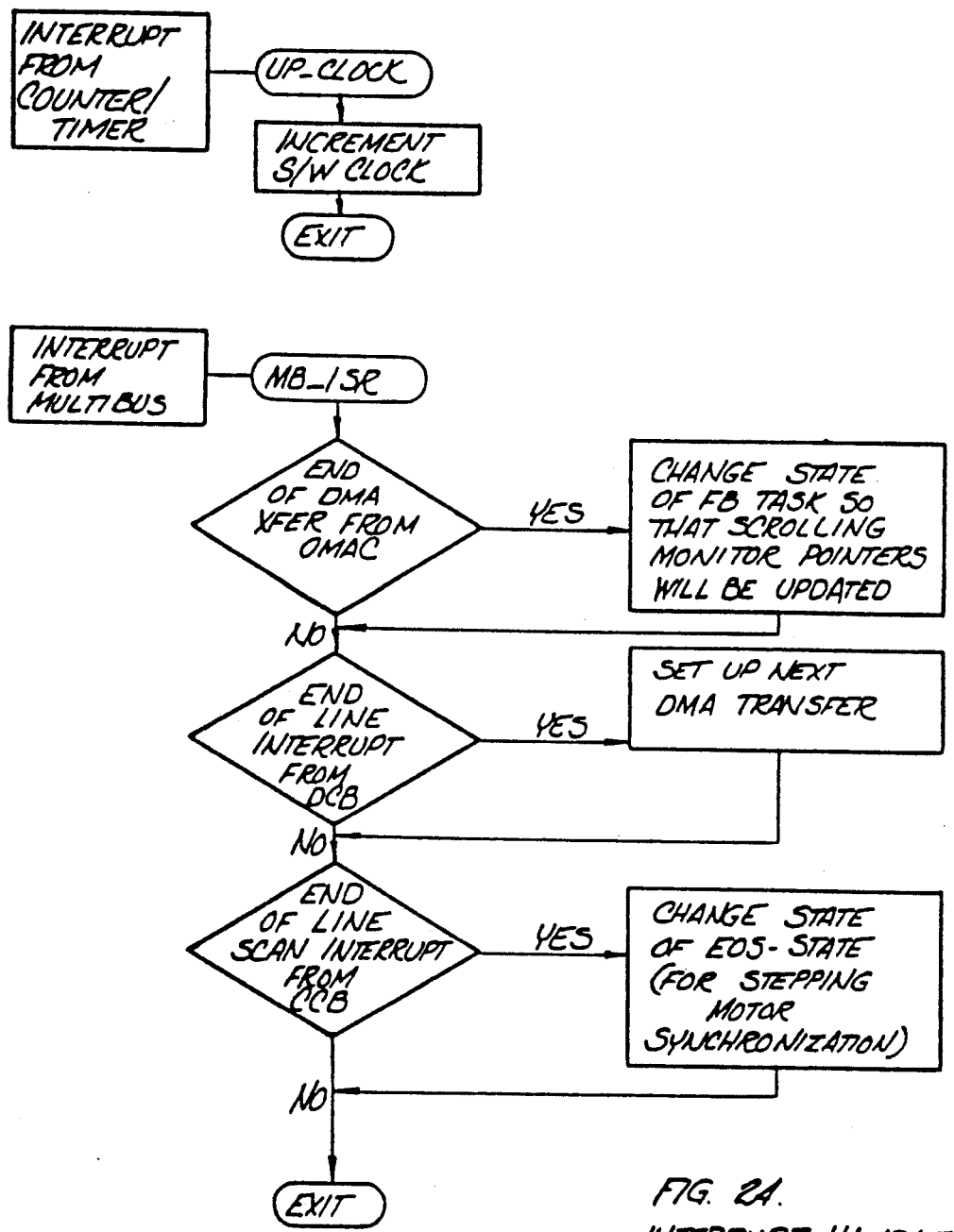

FIGS. 23 and 24 disclose the interrupt handlers module. The interrupt handlers module is a collection of the routines which serve as the various interrupts of the system.

Figure 25:
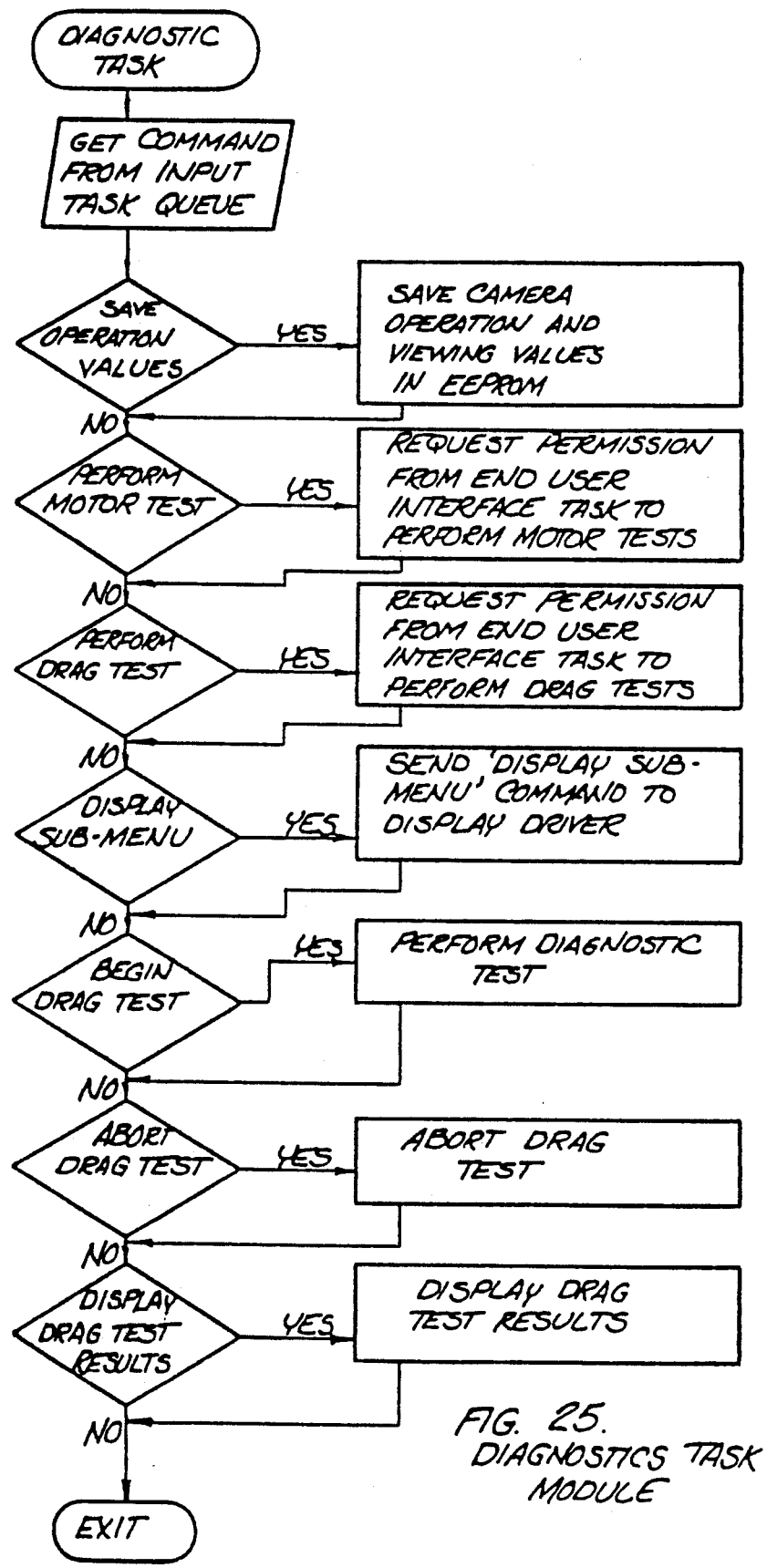

FIG. 25 discloses the diagnostic task module. The diagnostic task module performs various diagnostic tests and displays the test results.

Consequently, the present invention provides a system which is capable of high speed, high resolution scanning of documentary data over a large scanning width. Scanning width of 40 inches wide or more by a continuous length are provided so that virtually any size document. Both U.S. and I.S.O. size documents can be scanned without the need for reduction and loss of information. The present invention utilizes multiple CCD cameras which give high resolution and wide format. They permit selective capture or data suppression. Spatial compressor board 18 provides for variable resolution which allows for the choice of the most appropriate scan resolution for the end user device. Real time auto-thresholding is also provided which provides cleaner data from clear originals. Less unwanted data is provided from poor originals. A CRT monitor allows real time observation of the scan data to provide for adjustment during processing. Windowing functions are also provided to view data at different resolution qualities. The on-board data compression capabilities of the system reduce communication, storage and processing requirements. The present invention also provides for variable scans feed rates which accommodate data rate requirements for various host computers and other host devices. The device can accept translucent, transparent or opaque documents and essentially has no limitation to the media type. The invention also provides for auto-calibration and color correction so as to provide excellent color sensitivity. The present invention also has illuminated indicators for document loading which simplify production work for large scale data capture requirements. The present invention also has built-in diagnostics which simplify installation, repair and maintenance of the device. The present invention can scan documents at a high rate of speed and is capable of scanning E-size documents in four minutes at a resolution of 1,000 pixels per inch. It can also scan D-size documents in less than one minute at a resolution of 400 pixels per inch. The transport speed of the present invention is user selectable through software. The present invention can scan at a maximum of 500 inches per minute at 100 pixels per inch resolution, and a maximum rate of 10 inches per minute at a resolution of 1,000 pixels per inch. Variable resolution allows for adaptation of the scanner to various end users and various data scanning rates. Data compression is provided in the output through run length encoding techniques. Threshold control is user selectable and provides non-thresholded gray (6 bit) thresholding, absolute thresholding, and automatic thresholding options. Reflective light is color corrected to allow greater sensitivity to the blue range and infra-red filtering which provides a flat response of ±5 db from 500 nanometers to 700 nanometers and 20 db at 1,100 nanometers. The present invention uses easy function selection devices such as a cursor control and enter button with entirely menu driven from software. The present invention can be used for facsimile transmission, image capture for CAD/CAM conversion and graphics/textural scanning for electronics publishing applications. Additionally, convenient storage of large amount of data on magnetic tape or magnetic disk can be accomplished with the ability of readily access the information. This is extremely useful in industries such as the insurance industry or any industry which has the need to store large amounts of data and requires ready access to the data.

The foregoing description of the invention has been presented for the purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A high speed, high resolution scanning system including:
   optical scanning means for producing an analog signal representative of the pixels scanned on a field;
   video converter means connected to said optical scanning means for converting said analog signal to digitized data signals representative of said pixels;
   spatial compressor means connected to the output of said video converter means for reducing resolution;
   said spatial compressor means including means for compressing data by a numerical value;
   said means for compressing data including averaging means for generating a digital signal representative of the average of the value of said digitized data for each plurality of consecutive pixels equal in number to said numerical value so that a number of digital signals generated by said spatial compressor is reduced from the number of digitized data signals generated by said video converter by dividing said number of digitized data by said numerical value;
   whereby, said digital signals generated by said spatial compressor can be subsequently utilized to represent a field scanned by said system.

2. The system of claim 1 wherein said spatial compressor includes means for accumulating the digitized data signals representative of a plurality of consecutive pixels, dividing means responsive to the accumulating means for dividing said accumulated data after a plurality of said digitized data equal to said numerical value are accumulated.

3. The system of claim 2 wherein said averaging means permits averaging the value of said digitized data for a plurality of pixels less than said numerical value and for a plurality of pixels more than said numerical value when said numerical value is not equal to an integer so that the average of said pluralities of pixels is substantially equal to said numerical value.

4. The system of claim 1 wherein said optical scanning means comprises a linear detector array which includes individual detector elements.

5. The system of claim 4 wherein said video converter means also includes means for calibrating the digitized data generated by said video converter means to adjust for differences in response levels of individual detector elements of said linear detector array.

6. A high speed, high resolution document scanning system including:
   optical scanning means for producing an analog signal representative of the pixels scanned on a document;
   video converter means connected to said optical scanning means for converting said analog signal to digitized data signals representative of said pixels;
   spatial compressor means connected to the output of said video converter means for reducing resolution to match the data handling capabilities of an end user device;
   said spatial compressor means including means for compressing data by a numerical value in accordance with the resolution required by the end user;
   said means for compressing data including averaging means for generating a digital signal representative of the average of the value of said digitized data for each plurality of consecutive pixels equal in number to said numerical value so that a number of digital signals generated by said spatial compressor is reduced from the number of digitized data signals generated by said video converter by dividing said number of digitized data by said numerical value;
   whereby, said digital signals generated by said spatial compressor can be subsequently utilized to reproduce optically a document scanned by said system.

7. The system of claim 6 wherein said scanning means includes means for moving said document with respect to said scanner, said means for moving controlling the speed of movement of said document in accordance with the reduction of resolution.

* * * * *